United States Patent
Smit et al.

(10) Patent No.: US 10,539,812 B2
(45) Date of Patent: Jan. 21, 2020

(54) EYEWEAR CONTROL SYSTEM AND METHOD, AND AN EYEWEAR DEVICE

(71) Applicant: SWITCH MATERIALS INC., Burnaby (CA)

(72) Inventors: Matthew Smit, Burnaby (CA); Simon Gauthier, Burnaby (CA); Duhane Lam, Burnaby (CA)

(73) Assignee: SWITCH MATERIALS INC., Burnaby (CA)

( * ) Notice: Subject to any disclaimer, the term of this patent is extended or adjusted under 35 U.S.C. 154(b) by 95 days.

(21) Appl. No.: 15/570,888

(22) PCT Filed: Apr. 29, 2016

(86) PCT No.: PCT/CA2016/050503
§ 371 (c)(1),
(2) Date: Oct. 31, 2017

(87) PCT Pub. No.: WO2016/176769
PCT Pub. Date: Nov. 10, 2016

(65) Prior Publication Data
US 2018/0107025 A1    Apr. 19, 2018

Related U.S. Application Data

(60) Provisional application No. 62/156,020, filed on May 1, 2015.

(51) Int. Cl.
*G02C 7/10* (2006.01)
*G02F 1/163* (2006.01)

(52) U.S. Cl.
CPC ............. *G02C 7/101* (2013.01); *G02F 1/163* (2013.01)

(58) Field of Classification Search
CPC .......... G02B 2027/0178; G02B 5/1828; G02B 5/20; G02C 7/083; G02C 7/101; G02C 7/081

(Continued)

(56) References Cited

U.S. PATENT DOCUMENTS

| 8,441,707 B2 | 5/2013 | Lam et al. |
| 9,568,799 B2 * | 2/2017 | Lam .......................... E06B 9/24 |
| 2014/0354940 A1 | 12/2014 | Lam et al. |

FOREIGN PATENT DOCUMENTS

| WO | 2009/108753 A1 | 9/2009 |
| WO | 2012/079160 A1 | 6/2012 |
| WO | 2013/155612 A1 | 10/2013 |

OTHER PUBLICATIONS

SkiGearTV, "Sneak Peek 2015 Uvex Snowstrike Variotronic Ski and Snowboarding Goggle Review," YouTube, published Feb. 25, 2014, retrieved Apr. 16, 2018, URL=https://www.youtube.com/watch?v=1dd1NDC24ps (screenshot only).

(Continued)

Primary Examiner — Hung X Dang
(74) Attorney, Agent, or Firm — Cozen O'Connor

(57) ABSTRACT

An eyewear control system for a variable transmittance optical filter assembly configurable to cover at least a portion of a lens of an eyewear device. The eyewear control system includes a controller communicatively coupled to a pair of load terminals. The eyewear control system also includes a light sensor communicatively coupled to the controller to provide a detector output signal, the light sensor being positioned to receive sunlight transmitted through the optical filter assembly and towards an eye of a person wearing the eyewear device, the detector output signal being set in dependence on an amount of sunlight received by the light sensor. The eyewear control system also includes a memory communicatively coupled to the controller and having encoded thereon computer program code executable by the controller to transition the optical filter assembly between operating states when coupled to the pair of load terminals. The controller is operable to vary a voltage across the load terminals in dependence on the detector output signal to vary an amount of sunlight transmitted to the eye by the optical filter assembly.

18 Claims, 24 Drawing Sheets

(58) Field of Classification Search
USPC .......................... 351/158, 41; 359/245, 241
See application file for complete search history.

(56) References Cited

OTHER PUBLICATIONS

Uvex Sports, "4 is more—Variotronic technology," *YouTube*, published Oct. 29, 2014, retrieved Apr. 16, 2018, URL=https://www.youtube.com/watch?v=VXudzOsjpTo (screenshot only).
International Search Report and Written Opinion, dated May 25, 2016, for International Application No. PCT/CA2016/050503, 10 pages.

\* cited by examiner

EYEWEAR CONTROL SYSTEM AND METHOD, AND AN EYEWEAR DEVICE

TECHNICAL FIELD

The present disclosure is directed towards an eyewear control system, an eyewear device, and a method for controlling a variable transmittance optical filter assembly configurable to cover at least a portion of a lens of an eyewear device.

BACKGROUND

Eyewear or eyewear devices are widely used by people to filter or reduce the intensity of light hitting their eyes. For example, when participating in snow sports, it is usual for people to wear an eyewear device, such as, for example, glasses or goggles, in order to reduce the intensity of light transmitted into their eyes from the sun and from reflective surfaces, such as snow and ice. It may be desirable to attenuate different light intensities by different amounts. For example, on a very bright day, it may be desirable for the eyewear to provide a greater amount of attenuation than when compared to a less bright day.

SUMMARY

A first aspect provides an eyewear control system for a variable transmittance optical filter assembly configurable to cover at least a portion of a lens of an eyewear device, the optical filter assembly comprising a pair of terminals and an optical filter electrically coupled to or between the pair of terminals, the eyewear control system comprising: (a) a controller communicatively coupled to a pair of load terminals for electrically coupling to the terminals of the optical filter assembly; (b) a light sensor communicatively coupled to the controller to provide a detector output signal, the light sensor being positioned to receive light (and, in one particular embodiment, sunlight) transmitted through the optical filter assembly and towards an eye of a person wearing the eyewear device, the detector output signal being set in dependence on an amount of light received by the light sensor; and (c) a memory communicatively coupled to the controller and having encoded thereon computer program code executable by the controller to transition the optical filter assembly between operating states, wherein the controller varies a voltage across the load terminals in dependence on the detector output signal to vary an amount of light transmitted through the optical filter assembly.

In an embodiment, the computer program code encoded on the memory is executable by the controller to apply a pulse width modulated voltage signal across the load terminals, wherein the pulse width modulated signal comprises a plurality of voltage pulses. In an embodiment, the computer program code encoded on the memory is executable by the controller to vary a duty cycle of at least one of the plurality of voltage pulses in dependence on the detector output signal. In an embodiment, the computer program code encoded on the memory is executable by the controller to vary the duty cycle when the detector output signal is at or above a first threshold and at or below a second threshold.

In an embodiment, the computer program code encoded on the memory is executable by the controller to vary the duty cycle linearly with respect to the detector output signal. In an embodiment, the computer program code encoded on the memory is executable by the controller to vary the duty cycle non-linearly with respect to the detector output signal.

In an embodiment, the computer program code encoded on the memory is executable by the controller to calculate the duty cycle by applying a gain to a difference between the second threshold and the detector output signal.

In an embodiment, if the calculated duty cycle is below a lower duty cycle limit, the duty cycle is set to the lower duty cycle limit and, if the calculated duty cycle is above an upper duty cycle limit, the duty cycle is set to the upper duty cycle limit.

In an embodiment, the computer program code encoded on the memory is executable by the controller to apply the pulse width modulated voltage signal across the load terminals by: comparing the detector output signal to the first threshold; setting the duty cycle of at least one of the plurality of voltage pulses to a first preset duty cycle when the detector output signal is below the first threshold; comparing the detector output signal to the second threshold; and setting the duty cycle of at least one of the plurality of voltage pulses to a second preset duty cycle when the detector output signal exceeds the second threshold.

In an embodiment, the detector output signal comprises a luminance value, the first threshold is a lower luminance threshold, and the second threshold is an upper luminance threshold.

In an embodiment, each of the plurality of voltage pulses has a pulse width between 0.05 seconds and 0.10 seconds.

In an embodiment, at least one of the voltage pulses is set to a voltage of one polarity and at least another of the voltage pulses is set to a voltage of an opposite polarity, in dependence on the detector output signal.

In an embodiment, the first aspect further comprises an input device communicatively coupled to the controller to provide an input signal, and wherein the computer program code encoded on the memory is executable by the controller to vary the voltage across the load terminals in dependence on the input signal. In an embodiment, the computer program code encoded on the memory is executable by the controller to vary a duty cycle of at least one of the plurality of voltage pulses in dependence on the input signal. In an embodiment, the computer program code encoded on the memory is executable by the controller to set a duty cycle of at least one of the plurality of voltage pulses to a constant value in dependence on the input signal. In an embodiment, the computer program code encoded on the memory is executable by the controller to set at least one of the first and second thresholds in dependence on the input signal.

In an embodiment, the input device comprises at least one of a switch, a clock, a timer, and a receiver. In an embodiment, the input device comprises a single button, the single button being operable to provide different input signals depending on a length of time the single button is depressed.

In an embodiment, the first aspect further comprises a housing coupleable to a portion of the eyewear device, the housing being configured to enclose at least the controller and the memory.

In an embodiment, the first aspect further comprises an optical filter assembly comprising a pair of terminals and an optical filter electrically coupled between the pair of terminals, wherein the optical filter is a hybrid photochromic-electrochromic optical filter.

A second aspect provides a method for controlling a variable transmittance optical filter assembly configurable to cover at least a portion of a lens of an eyewear device, the optical filter assembly comprising a pair of terminals and an optical filter electrically coupled to or between the terminals, the method comprising: (a) detecting an amount of light (and, in one particular embodiment, sunlight) transmitted through the optical filter assembly and towards an eye of a person wearing the eyewear device; and (b) varying an electrical voltage applied across the terminals in dependence on the detected amount of light to vary an amount of light transmitted through the optical filter assembly.

In an embodiment, the second aspect further comprises applying a pulse width modulated voltage signal across the terminals, wherein the pulse width modulated signal comprises a plurality of voltage pulses. In an embodiment, the second aspect further comprises varying a duty cycle of at least one of the plurality of voltage pulses in dependence on the detected amount of light. In an embodiment, the second aspect further comprises varying the duty cycle when the detected amount of light is at or above a first threshold and at or below a second threshold.

In an embodiment, the second aspect further comprises varying the duty cycle linearly with respect to the detector output signal. In an embodiment, the second aspect further comprises varying the duty cycle non-linearly with respect to the detector output signal.

In an embodiment, the second aspect further comprises calculating the duty cycle by applying a gain to a difference between the second threshold and the detector output signal. In an embodiment, the second aspect further comprises if the calculated duty cycle is below a lower duty cycle limit, setting the duty cycle to the lower duty cycle limit and, if the calculated duty cycle is above an upper duty cycle limit, setting the duty cycle to the upper duty cycle limit.

In an embodiment, the second aspect further comprises: comparing the detected amount of light to the first threshold; setting the duty cycle of at least one of the plurality of voltage pulses to a first preset duty cycle when the detected amount of light is below the first threshold; comparing the detected amount of light to the second threshold; and setting the duty cycle of at least one of the plurality of voltage pulses to a second preset duty cycle when the detected amount of light meets or exceeds the second threshold.

In an embodiment, the detected amount of light comprises a luminance value, the first threshold is a lower luminance threshold, and the second threshold is an upper luminance threshold.

In an embodiment, each of the plurality of voltage pulses has a pulse width between 0.05 seconds and 0.10 seconds.

In an embodiment, the second aspect further comprises setting at least one of the voltage pulses to a voltage of one polarity and setting at least another of the voltage pulses to a voltage of an opposite polarity, in dependence on the detected amount of light.

In an embodiment, the second aspect further comprises: receiving an input signal from an input device; and varying the voltage across the load terminals in dependence on the input signal. In an embodiment, the second aspect further comprises varying a duty cycle of at least one of the plurality of voltage pulses in dependence on the input signal. In an embodiment, the second aspect further comprises setting a duty cycle of at least one of the plurality of voltage pulses to a constant value in dependence on the input signal. In an embodiment, the second aspect further comprises setting at least one of the first and second thresholds in dependence on the input signal.

A third aspect provides an eyewear device comprising an eyewear control system according to the first aspect.

A fourth aspect provides an eyewear control system for a variable transmittance optical filter assembly configurable to cover at least a portion of a lens of an eyewear device, the optical filter assembly comprising a pair of terminals and an optical filter electrically coupled to or between the pair of terminals, the eyewear control system comprising: (a) a controller communicatively coupled to a pair of load terminals for electrically coupling to the terminals of the optical filter assembly; (b) a light sensor communicatively coupled to the controller to provide a detector output signal, the light sensor being positioned to receive light (and, in one particular embodiment, sunlight) transmitted through the optical filter assembly and towards an eye of a person wearing the eyewear device, the detector output signal being set in dependence on an amount of light received by the light sensor; and (c) a memory communicatively coupled to the controller and having encoded thereon statements and instructions executable by the controller to transition the optical filter assembly between operating states, wherein the controller varies a voltage across the load terminals in dependence on the detector output signal to vary an amount of light transmitted through the optical filter assembly.

In an embodiment, the fourth aspect further comprises switching circuitry communicatively coupled between the controller and the pair of load terminals, the switching circuitry configured to apply the pulse width modulated voltage signal across the load terminals in response to a control input signal received from the controller. In an embodiment, the switching circuitry comprises at least one of an H-bridge, a single pole double throw switch, and a double pole double throw switch.

In an embodiment, the voltage applied across the load terminals comprises a plurality of pulses, wherein at least one of the pulses comprises a voltage of one polarity, and at least another of the pulses comprises a voltage of an opposite polarity. In an embodiment, the voltage signal is an alternating signal alternating between the one polarity and the opposite polarity. In an embodiment, the alternating signal has a switching interval between 0.5 s to 30 s.

In an embodiment, the fourth aspect further comprises an input device communicatively coupled to the controller to provide an input signal, and wherein the statements and instructions encoded on the memory are executable by the controller to apply the voltage signal upon receiving the input signal. In an embodiment, the input device comprises at least one of a switch, a clock, a timer, and a receiver. In an embodiment, the statements and instructions encoded on the memory are executable by the controller to perform a method comprising: comparing the input signal to a threshold; and when the input signal is below the threshold, applying the voltage signal across the load terminals.

In an embodiment, the fourth aspect further comprises switching circuitry communicatively coupled between the controller and the pair of load terminals, the switching circuitry configured to vary the voltage signal across the pair of load terminals in response to a control input signal received from the controller. In an embodiment, wherein the switching circuitry comprises at least one of an H-bridge, a single pole double throw switch, and a double pole double throw switch.

A fifth aspect provides an eyewear control system for a variable transmittance optical filter assembly configurable to cover at least a portion of a lens of an eyewear device, the optical filter assembly comprising a pair of terminals and an optical filter electrically coupled to or between the pair of terminals, the control system comprising: (a) a controller communicatively coupled to a pair of load terminals for electrically coupling to the terminals of the optical filter assembly; (b) a light sensor communicatively coupled to the controller to provide a detector output signal, the light sensor being positioned to receive light (and, in one particular embodiment, sunlight) transmitted through the optical filter assembly and towards an eye of a person wearing the eyewear device, the detector output signal being set in dependence on an amount of light received by the light sensor; and (c) a memory communicatively coupled to the controller and having encoded thereon statements and instructions executable by the controller to transition the optical filter assembly between operating states in dependence on the detector output signal, wherein the controller allows the optical filter assembly to transition to a dark state by shorting the load terminals together or by creating an open circuit between the load terminals, and wherein the transmittance of the optical filter assembly decreases to a minimum transmittance in response to light striking the optical filter and increases to a maximum transmittance in response to a voltage being applied across the terminals of the optical filter assembly.

A sixth aspect provides an eyewear optical filtering system comprising: (a) an input voltage terminal to which an input voltage can be applied; (b) an optical filter assembly configurable to cover at least a portion of a lens of an eyewear device, the optical filter assembly comprising a pair of terminals and an optical filter electrically coupled to or between the pair of terminals, wherein the transmittance of the optical filter assembly decreases to a minimum transmittance in response to light (and, in one particular embodiment, sunlight) striking the optical filter and increases to a maximum transmittance in response to a voltage applied across the terminals of the optical filter assembly; (c) a pair of load terminals to which the terminals of the optical filter assembly are electrically coupled; (d) switching circuitry for switching the optical filter assembly between a light state and a dark state, wherein the switching circuitry applies at least a portion of the input voltage across the load terminals to switch the assembly to the light state, and the switching circuitry short circuits or open circuits the load terminals, to switch the assembly to the dark state; (e) a light sensor communicatively coupled to the switching circuitry to provide a detector output signal, the light sensor being positioned to receive light transmitted through the optical filter assembly and towards an eye of a person wearing the eyewear device, the detector output signal being set in dependence on an amount of light received by the light sensor, wherein the switching circuit switches the optical filter assembly between the light state and the dark state in dependence on the detector output signal.

A seventh aspect provides an eyewear optical filtering system comprising: (a) an input voltage terminal to which an input voltage can be applied; (b) an optical filter assembly configurable to cover at least a portion of a lens of an eyewear device, the optical filter assembly comprising a pair of terminals and an optical filter electrically coupled to or between the pair of terminals, wherein the transmittance of the optical filter assembly decreases to a minimum transmittance in response to light (and, in one particular embodiment, sunlight) striking the optical filter and increases to a maximum transmittance in response to a voltage applied across the terminals of the optical filter assembly; (c) a pair of load terminals to which the terminals of the optical filter assembly are electrically coupled; (d) switching circuitry switchable to apply at least a portion of the input voltage across the load terminals in one polarity and an opposite polarity; and (e) a light sensor communicatively coupled to the switching circuitry to provide a detector output signal, the light sensor being positioned to receive light transmitted through the optical filter assembly and towards an eye of a person wearing the eyewear device, the detector output signal being set in dependence on an amount of light received by the light sensor, wherein the switching circuit is switchable to apply at least a portion of the input voltage across the load terminals in one polarity and an opposite polarity independence on the detector output signal.

An eighth aspect provides a method for controlling a variable transmittance optical filter assembly configurable to cover at least a portion of a lens of an eyewear device, the optical filter assembly comprising a pair of terminals and an optical filter electrically coupled to or between the terminals, the method comprising: (a) detecting an amount of light (and, in one particular embodiment, sunlight) transmitted through the optical filter assembly and towards an eye of a person wearing the eyewear device; (b) based on the amount of light detected, applying a voltage across the terminals of the optical filter assembly sufficient to transition the optical filter assembly to a light state; and (c) based on the amount of light detected, shorting or open circuiting the terminals of the optical filter assembly together to allow the optical filter assembly to transition to a dark state, wherein the transmittance of the optical filter assembly decreases to a minimum transmittance in response to light striking the optical filter and increases to a maximum transmittance in response to a voltage being applied across the terminals of the optical filter assembly.

In an embodiment, the eighth aspect further comprises receiving an input signal from an input device, and wherein shorting or open circuiting the terminals of the optical filter assembly together is performed upon receiving the input signal. In an embodiment, the input device comprises at least one of a switch, a clock, a timer, and a receiver.

In an embodiment, the eighth aspect further comprises comparing the amount of light detected to a threshold, wherein shorting or open circuiting the terminals of the optical filter assembly together is performed when the amount of light detected meets or exceeds the threshold.

A ninth aspect provides a method for controlling a variable transmittance optical filter assembly configurable to cover at least a portion of a lens of an eyewear device, the optical filter assembly comprising a pair of terminals and an optical filter electrically coupled to or between the terminals, the method comprising: (a) detecting an amount of light (and, in one particular embodiment, sunlight) transmitted through the optical filter assembly and towards an eye of a person wearing the eyewear device; and (b) varying an electrical voltage across the terminals in dependence on the detected amount of light to vary an amount of light transmitted through the optical filter assembly.

In an embodiment, the ninth aspect further comprises transitioning the optical filter assembly from a first operating state to a second operating state by applying a voltage signal comprising a plurality of pulses across the terminals, wherein at least one of the pulses comprises a voltage of one polarity, and at least another of the pulses comprises a voltage of an opposite polarity. In an embodiment, the voltage signal is an alternating signal alternating between the one polarity and the opposite polarity. In an embodiment, the alternating signal has a switching interval between 0.5 s to 30 s.

In an embodiment, the ninth aspect further comprises receiving an input signal from an input device, wherein the electrical voltage across the load terminals is varied in dependence on the input signal. In an embodiment, the input device comprises at least one of a switch, a clock, a timer, and a receiver. In an embodiment, the ninth aspect further comprises receiving an input signal from an input device; and comparing the input signal to a threshold, wherein the voltage signal is applied across the terminals when the input signal is below the threshold.

A tenth aspect provides an eyewear control system for a variable transmittance optical filter assembly configurable to cover at least a portion of a lens of an eyewear device, the optical filter assembly comprising a pair of terminals and an optical filter electrically coupled to or between the pair of terminals, the control system comprising: (a) a controller; (b) switching circuitry communicatively coupled to the controller, the switching circuitry comprising a pair of input voltage terminals for receiving an input voltage, and a pair of load terminals for electrically coupling to the terminals of the optical filter assembly, wherein the controller is configured to: apply a portion of the input voltage across the load terminals in a forward polarity, apply a portion of the input voltage across the load terminals in a reverse polarity, short the load terminals together, or remove voltage from the load terminals, in response to a control signal received from the controller; (c) a light sensor communicatively coupled to the controller to provide a detector output signal, the light sensor being positioned to receive light (and, in one particular embodiment, sunlight) transmitted through the optical filter assembly and towards an eye of a person wearing the eyewear device, the detector output signal being set in dependence on an amount of light received by the light sensor, (d) a memory communicatively coupled to the controller and having encoded thereon statements and instructions executable by the controller to send the control signal to the switching circuitry according to a desired operating state of the optical filter assembly, wherein the controller generates the control signal in dependence on the detector output signal to vary an amount of light transmitted to the eye by the optical filter assembly.

This summary does not necessarily describe the entire scope of all aspects. Other aspects, features and advantages will be apparent to those of ordinary skill in the art upon review of the following description of specific embodiments.

DETAILED DESCRIPTION

Figure 1A:
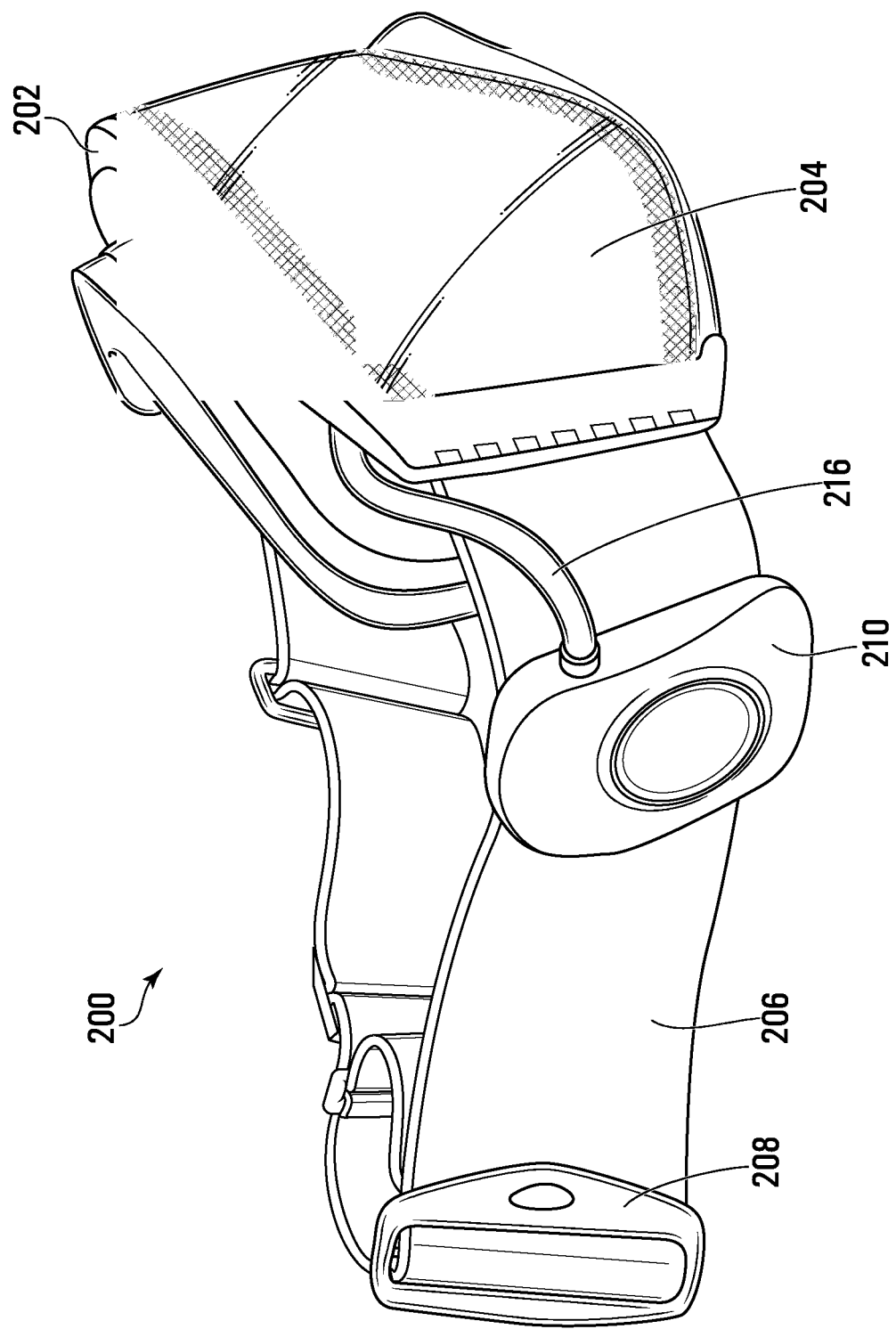
FIGS. 1A to 1F are various views and a diagram illustrating an eyewear control system coupled to an eyewear device, according to an embodiment.
Figure 1B:
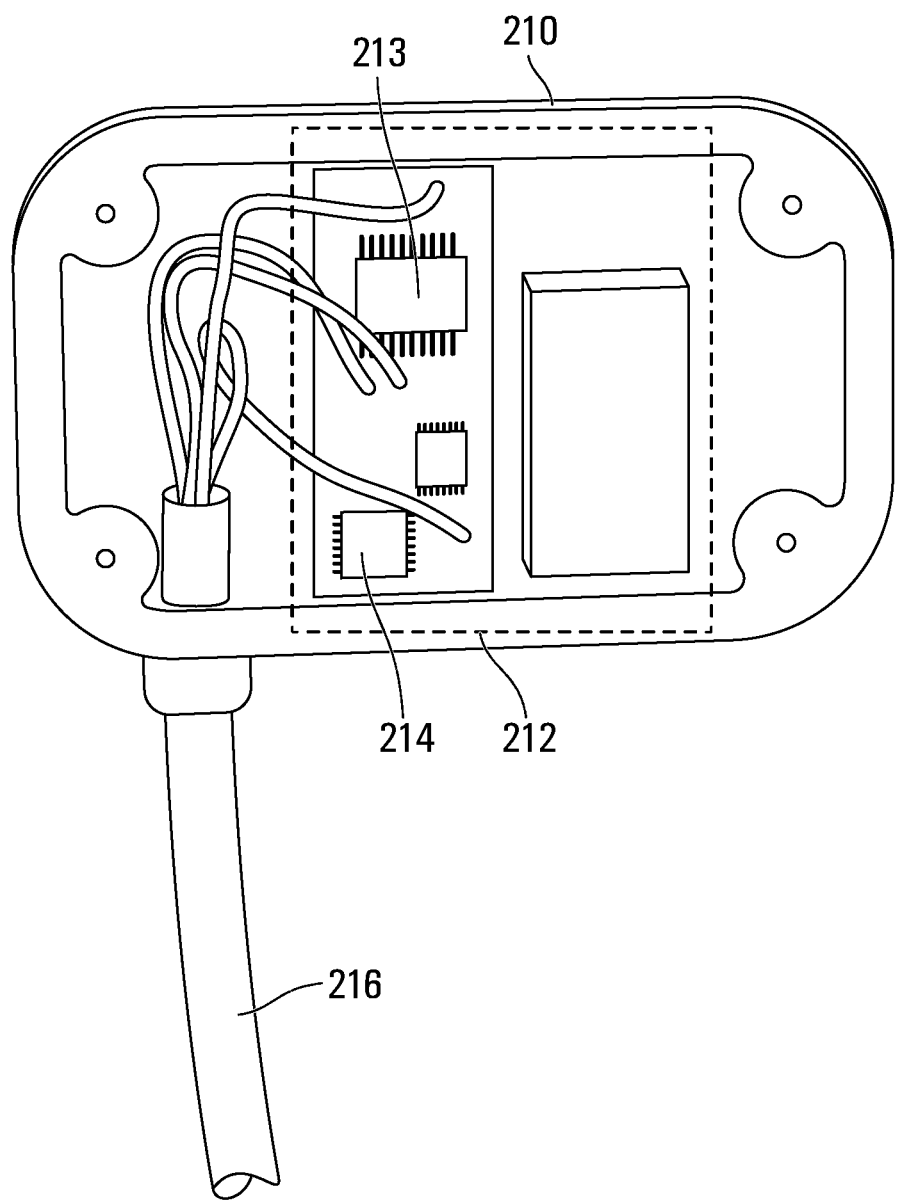
Figure 1C:
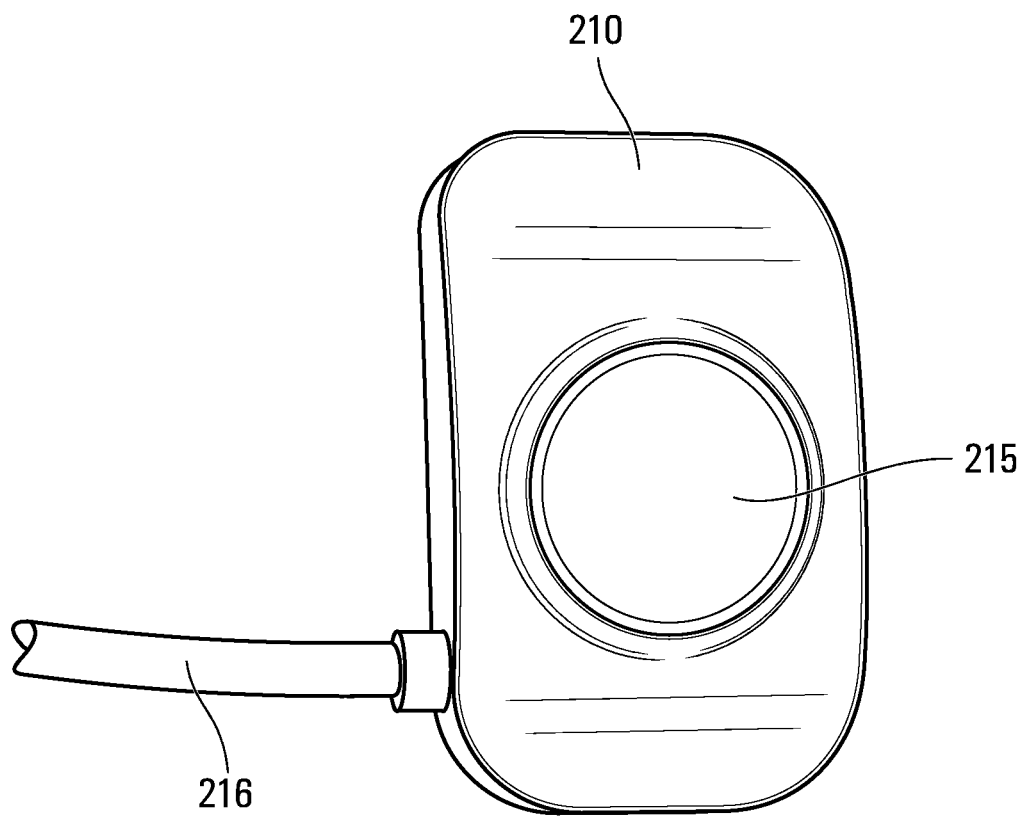

Various embodiments of control systems and control methods are described. It is to be understood that these control systems and control methods are for use with an eyewear device, such as, for example, glasses, goggles and the like. Specifically, in use, the control systems and methods control a variable transmittance optical filter assembly configurable to cover at least a portion of a lens of the eyewear device. In this way, the control system and methods control the transmittance of light through the portion of the lens covered by the optical filter assembly.

A large number of different static lenses are sold by eyewear manufacturers and those manufacturers often design frames that allow users to change their lenses. For example, ski goggle lenses come in a myriad of light transmission levels for different light conditions. However, an individual lens is usually optimal only for one particular light condition. If the light conditions change, the user has to live with a sub-optimal lens or change the lens to a different transmission level or colour. For example, a skier on a bright day may select a fairly dark lens. However, if the weather becomes overcast during the day they would need to swap lenses in order to be able to see well. This requires that the user carry multiple lenses, and stop to change the lens when light conditions change.

Also, when conditions are changing very rapidly, it may not be practical to switch lenses. For example, skiing on a bright day can involve significant changes in light levels. The light level can be very high on a brightly-lit open run, and can drop significantly when skiing into a shaded area or into trees. This poses a problem for the user because, as the user enters the dark area, his or her pupils are fully constricted due to the bright light conditions. As such, seeing is difficult in the darker areas until the eyes adjust, which could take on the order of minutes. During this time, the user may not be able to see obstacles very well, which could even pose a safety hazard. Furthermore, swapping lenses is not practical for these sorts of rapid transitions between light and dark areas because the transitions happen so quickly and the periods of time spent at each light level could be very short, for example, less than a minute.

An optical filter assembly includes an optical filter that is electrically coupled to or between a pair of terminals. The optical filter may be fabricated using any one of several different types of technologies. For example, the optical filter may be fabricated using photochromic, electrochromic, hybrid photochromic/electrochromic, liquid crystal, or suspended particle technologies. Photochromic optical filters tend to automatically darken when exposed to sunlight or UV, and lighten in the absence of sunlight or UV. Electrochromic, liquid crystal, and suspended particle technologies however, tend to alternate between dark and light operating states (or transmissive states) in response to electricity. Electrochromic optical filters, for example, tend to darken when a voltage differential is applied across a pair of terminals electrically coupled to different sides of the electrochromic material, and tend to lighten when the polarity of the voltage differential is reversed.

The optical filter assemblies used in the embodiments discussed herein are based on a hybrid photochromic/electrochromic technology, which conversely darken in response to sunlight, UV, or other particular wavelengths of electromagnetic radiation (hereinafter "light") and lighten or become transparent (hereinafter "lighten") in response to a non-zero voltage (hereinafter "voltage") applied across the terminals of the optical filter assembly. Hybrid photochromic/electrochromic optical filters comprise switching material having one or more chromophores that are reversibly interconvertible between coloured (dark) and uncoloured (light) states; the switching material may further comprise a solvent portion, polymer(s), salts, or other components to support the interconversion of the chromophore between coloured and uncoloured states when exposed to light or voltage. Some examples of chromophores may include fulgides, diarylethenes or dithienylcyclopentenes. However, in alternative embodiments (not depicted), other types of optical filters comprising alternate switching materials with similar behaviour to hybrid photochromic/electrochromic switching materials, may also be employed.

General Eyewear Device Environment

FIGS. 1A to 1F illustrate an eyewear control system in accordance with an embodiment. FIG. 1A shows an eyewear device in the form of goggles 200 having a frame 202 surrounding a lens 204. Either side of the frame 202 is attached to a different end of a head strap 206. In use, by a person (i.e. a human user) can wear the goggles 200 by positioning the frame 202 on their face such that the lens 204 is aligned with their eyes. The head strap 206 can be wrapped around their head and tightened via one or more strap adjusters 208 in order to hold the goggles 200 in position on their head and prevent the goggles 200 from falling off.

Also shown on FIG. 1A is an eyewear control system in accordance with an embodiment. Specifically, the control system includes a control system housing 210 attached to a portion of head strap 206. As seen more particularly on FIGS. 1B and 1C, the control system housing 210 contains control system electronics 212 which include a controller 213 and a memory 214. The memory 214 is communicatively coupled to the controller 213 and has encoded thereon statements and instructions (i.e. computer program code) which are executable by the controller 213. The control system electronics 212 may also include a light source 215 to indicate a mode of operation of the control system. In some embodiments other electronic components may also be provided, such as, for example, a power supply or battery. The control system electronics 212 are electrically coupled to one end of a cable 216. The cable 216 protrudes from the control system housing 210. The other end of the cable 216 is electrically coupled to both a variable transmittance optical filter assembly 218 and a light sensor (or light detector) 220. In this way, the controller 213 can receive electrical signals from the light sensor 220 and the controller 213 can transmit electrical signals to the optical filter assembly 218.

Figure 1D:
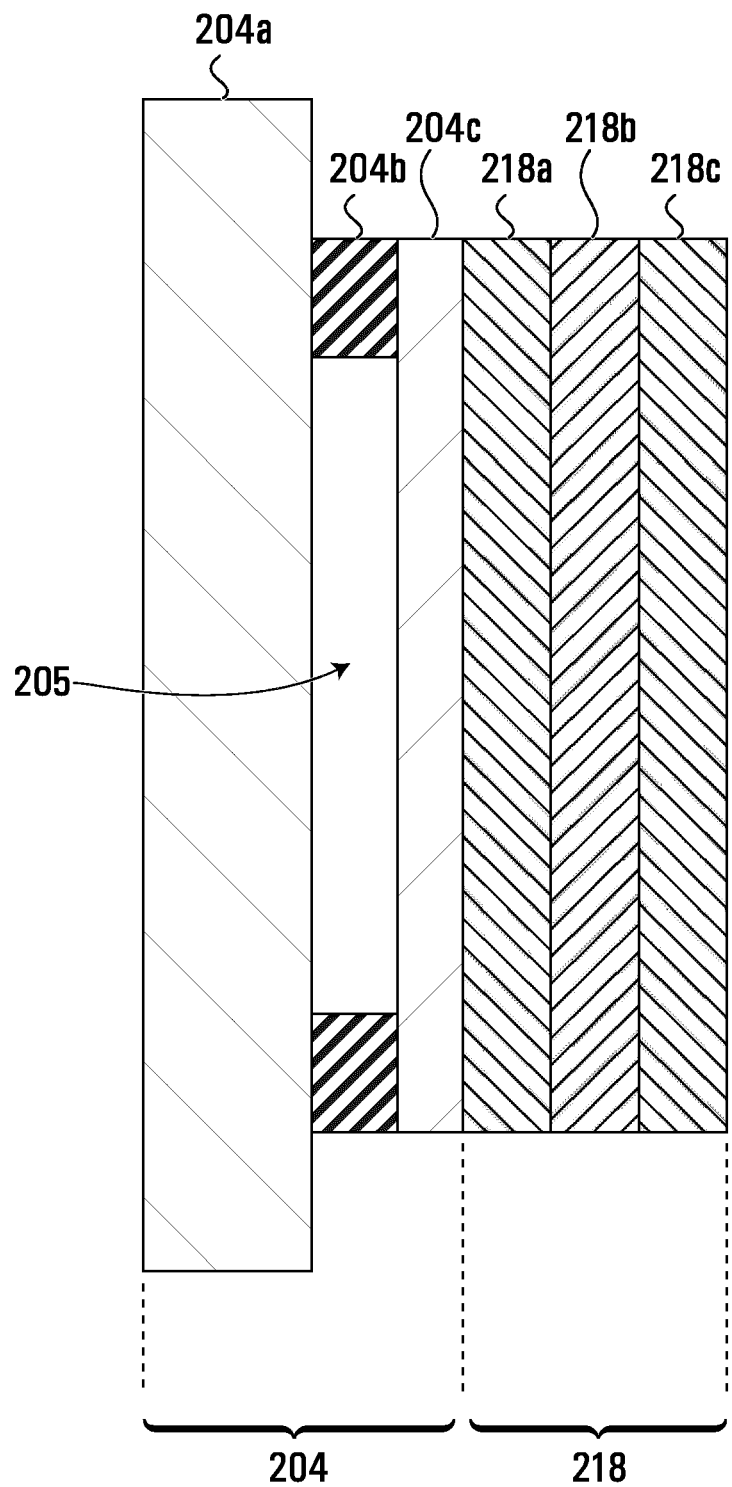
Figure 1E:
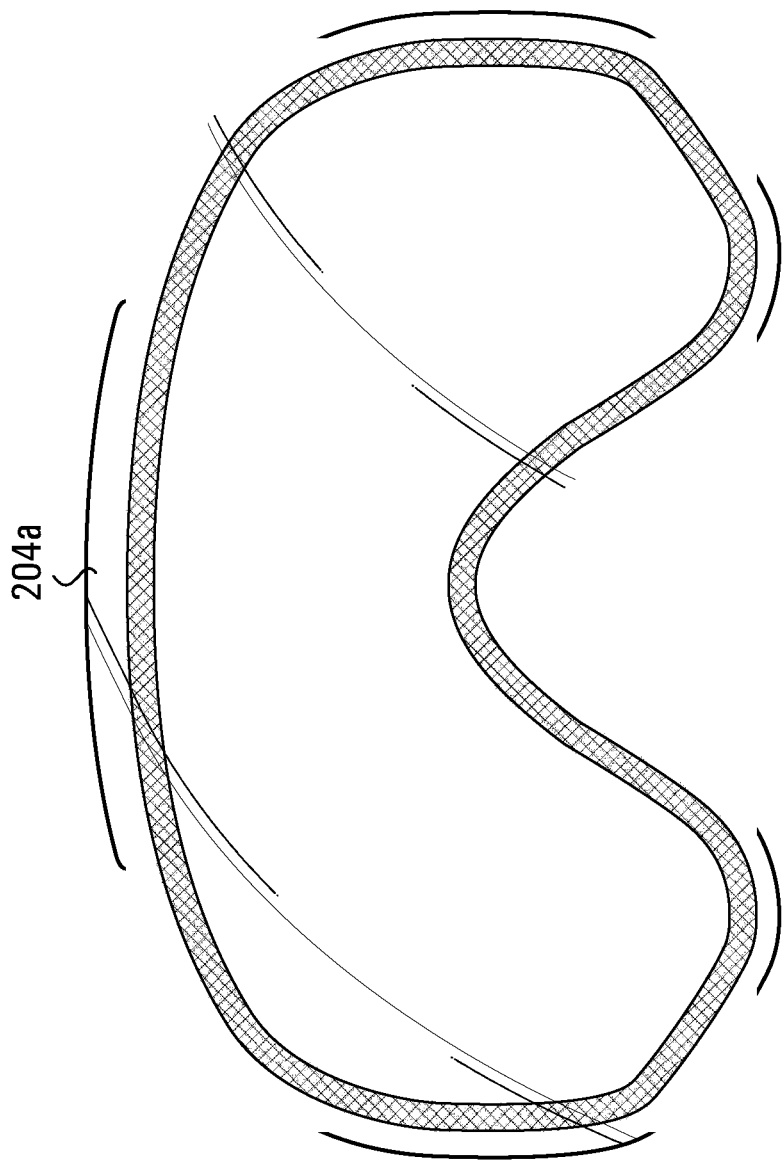

As seen more particularly on FIGS. 1D and 1E, a portion of the lens 204 is covered by the variable transmittance optical filter assembly 218 of the present embodiment. The optical filter assembly 218 may be fixedly attached to the lens 204, for example, via an adhesive. The lens 204 includes an outer lens 204a, an inner lens 204c and a foam spacer 204b sandwiched between the outer lens 204a and the inner lens 204c. In this way, an air gap 205 is maintained between the outer lens 204a and the inner lens 204c. In the present embodiment, the variable transmittance optical filter assembly 218 includes a pair of terminals 218a and 218c and an optical filter 218b electrically coupled between the pair of terminals 218a and 218c. The controller 213 is communicatively coupled to a pair of load terminals (not shown) which are in turn communicatively coupled, via the cable 216, to the terminals 218a and 218c of the optical filter assembly 218. In an embodiment, the optical filter 218b comprises a switchable photochromic/electrochromic material and the pair of terminals 218a and 218b are two transparent conductive electrodes. Examples of transparent conductive electrodes include indium tin oxide (ITO) coated PET and glass, as well as fluorine tin oxide (FTO) coated glass and other transparent conductive substrates. While the optical filter 218b is shown as being electrically coupled between the terminals 218a and 218c in FIG. 1D, in different embodiments (not depicted) the optical filter 218b may be differently electrically coupled to the terminals 218a and 218c. For example, the terminals 218a and 218c may be coupled to the same side of the optical filter 218b. One particular example of this different embodiment is provided in PCT publication number WO 2012/079160, the entirety of which is hereby incorporated herein, in which both of the terminals 218a and 218c are on one substrate and are interdigitated. While this example of the terminals 218a and 218c being coupled to the same side of the optical filter 218b is discussed here in respect particularly of the embodiment shown in FIG. 1D, it applies to the other embodiments discussed herein as well.

As mentioned above, the variable transmittance assembly 218 is configurable to cover at least a portion of the lens 204. In the embodiment of FIG. 1D it can be seen that the assembly 218 covers a portion of the lens 204 in that the terminal 218a is bonded to a portion of the inner lens 204c, for example, via an adhesive. It is to be understood that in other embodiments, different bonding techniques may be used, such as, for example, bonding via one or more fastening devices. However, it is also to be understood that the assembly 218 may cover at least a portion of the lens 204 without bonding. Additionally, it is to be understood that a different portion of the assembly 218 may be bonded to a different portion of the lens 204. For instance, the assembly 218 may cover a portion of the lens 204 in that the terminal 218c may be bonded to the outer lens 204a. Also, the assembly 218 may be positioned in-between different parts of the lens 204, for example, in-between the inner lens 204c and the outer lens 204c.

Figure 1F:
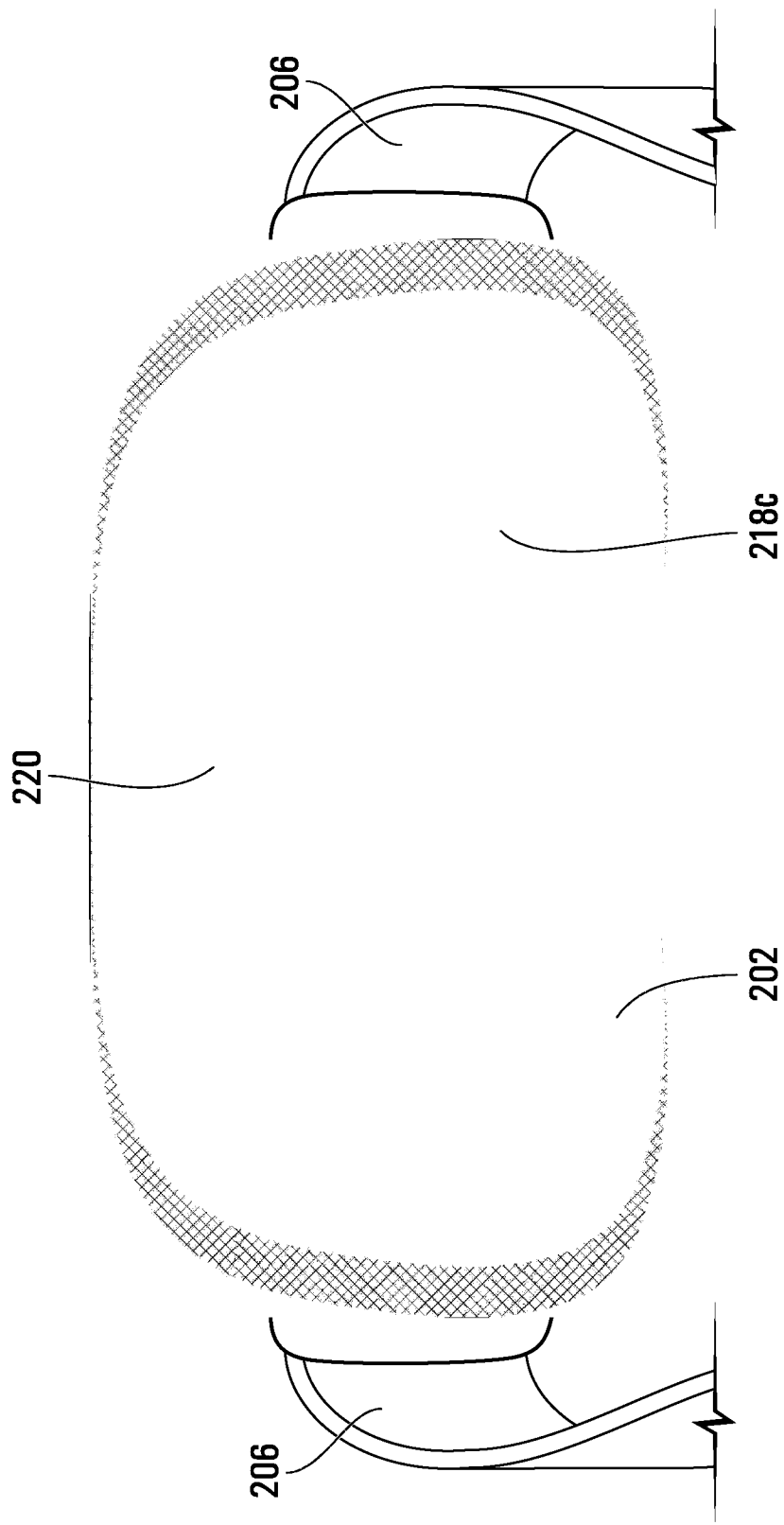

As seen more particularly on FIG. 1F, the light sensor 220 is positioned to receive light transmitted through the optical filter assembly 218 and towards an eye of a person wearing the goggles 200. In an embodiment, the light sensor 220 is positioned behind the optical filter assembly 218 and in front of the person's face. In this way, the light sensor 220 can be configured in use to detect an amount of light which provides a more accurate representation of the amount of light incident on the person's eyes compared to, for example, a light sensor 220 positioned on the opposite side of the optical filter assembly 218 to the person's eyes such that it measures the general ambient light conditions incident on the assembly 218. The light sensor 220 is configured to generate a detector output signal in dependence on the amount of light incident on the light sensor 220. The detector output signal may provide a magnitude (e.g. luminance) value which corresponds with a magnitude of light hitting the light sensor 220. In this way, the detector output signal may provide a representation of how much light is hitting the person's eye. The detector output signal may be transmitted from the light sensor 220 to the controller 213 via the cable 216.

In use, the statements and instructions encoded on the memory 214 are executable by the controller 213 to transition the optical filter assembly 218 between operating states. In particular, the controller 213 is configured to vary a voltage across the load terminals (not shown) in dependence on the detector output signal received from the light sensor 220. In this way, the controller 213 can control the transmittance of the optical filter 218b in response to the amount of light detected by the light sensor 220. For example, if the optical filter is a hybrid photochromic/electrochromic variable transmittance filter, when light has been shining on the optical filter assembly 218 for a period of time, the optical filter 218b is dark and accordingly is in the "dark state". The controller 213 may then cause a voltage to be applied across the terminals 218a and 218b to cause the optical filter 218b to lighten and transition to the "light state". When the controller 213 removes or reduces the voltage applied across terminals 218a and 218b, the optical filter 218b darkens.

Since the light sensor 220 is positioned such that it provides a representative measure of the amount of light incident on the eyes of the person wearing the goggles 200, the controller 213 can control the transmittance of the optical filter assembly 218 in response to the light incident on the eye. In this way, transmittance of light through the optical filter assembly 218 can be reduced if too much light is incident on the person's eye and transmittance of light through the optical filter assembly 218 can be increased if not enough light is incident on the person's eye.

It is to be understood that in different embodiments, the optical filter assembly 218 may cover a greater or lesser portion of the lens 204. For example, in some embodiments, the optical filter assembly 218 may cover all or a majority of the lens 204; however, in some other embodiments, the optical filter assembly 218 may cover only a minority of the lens 204. Furthermore, in some embodiments, the optical filter assembly 218 may comprise two or more portions; for example, one portion may be provided for each eye. These portions of the optical filter assembly 218 may be separate from or connected to each other. Further, these portions of the optical filter assembly 218 may be controlled separately or as one.

In an embodiment, the control system (i) causes the optical filter assembly 218 to transition from the dark state to the light state by causing a voltage to be applied across the terminals 218a and 218b, and (ii) causes the optical filter assembly 218 to transition from the light state to the dark state by configuring an open circuit between the terminals 218a and 218b. One issue encountered when using this configuration is the accumulation of electrical charge on the optical filter assembly 218's terminals 218a and 218c when in the light state. The residual charges result in a lingering electric field between the terminals 218a and 218c, which inhibits the optical filter assembly 218's transition to the dark state when the open circuit is formed. In another embodiment, the control system may apply a voltage across the optical filter assembly 218 in a forward polarity and, in some instances, short the terminals or apply a voltage in a reverse polarity to help dissipate residual charge.

Figure 2:
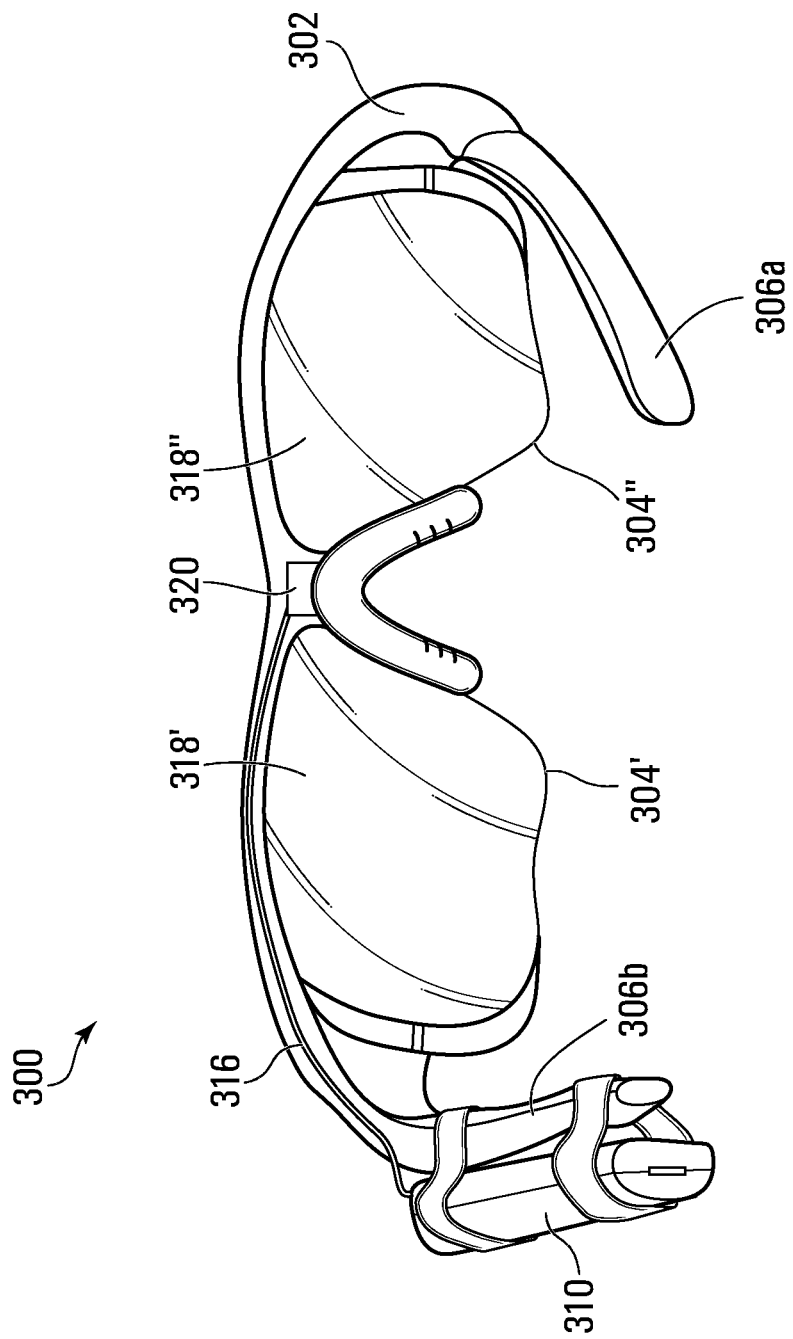
FIG. 2 shows an eyewear control system coupled to an eyewear device, according to another embodiment.

FIG. 2 illustrates an embodiment suitable for use with a different type of eyewear device, glasses 300. The glasses 300 have a frame 302 surrounding all of or a portion of two lenses 304' and 304". Either side of the frame 302 is attached to an end of a different one of arms 306a and 306b.

Also shown on FIG. 2 is an eyewear control system in accordance with an embodiment. The eyewear control system of FIG. 2 is analogous to the eyewear control system of FIGS. 1A to 1F. For example, the eyewear control system includes a control system housing 310 attached to an end portion of arm 306b. The control system housing 310 contains equivalent components as described above with respect to the control system housing 210. Also provided is a first optical filter assembly 318' configurable to cover a portion of lens 304' and a second optical filter assembly 318" configurable to cover a portion of lens 304". The first and second optical filter assemblies 318' and 318" are each equivalent to the optical filter assembly 218. Also provided is a light sensor 320 which is equivalent to the light sensor 220. Also provided is a cable 316 which (i) electrically couples the light sensor 320 to the controller (not shown) contained in the control system housing 310, and (ii) electrically couples the first and second optical filter assemblies 318' and 318" to the controller (not shown). The first and second optical filter assemblies 318' and 318" may be controlled by the controller (not shown) separately or as one.

General Eyewear Control System Infrastructure

The following description refers to control systems and methods; however, it is to be understood that the control systems and methods are for use with an eyewear device. As such, the control system and methods are considered eyewear control systems and methods. FIGS. 1A to 1F and 2 indicate possible ways in which the control systems and methods may be applied to an eyewear device.

Figure 4:
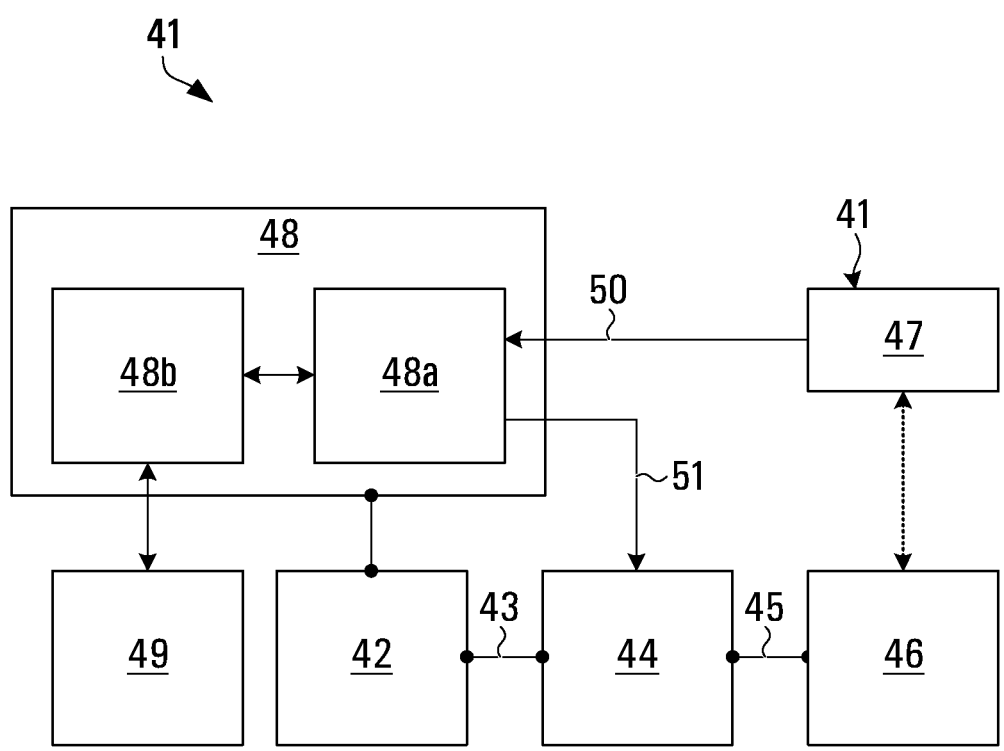
FIG. 4 is a block diagram of an eyewear control system for the optical filter assembly, according to another embodiment.

Referring to FIG. 4, there is shown one embodiment of the control system 40 for a variable transmittance assembly 46. The control system 40 comprises a controller 48 electrically coupled to a power supply 42; a memory 49 communicatively coupled to the controller 48 and having encoded statements and instructions executable by the controller 48; switching circuitry 44 controlled by the controller via control input 51, and which is also coupled to the power supply 42 through input voltage terminals 43; and a detector 47 that is communicatively coupled to the controller 48. The detector 47 may comprise for example, a light sensor to detect ambient lighting conditions or a switch to detect user input, but may comprise other types of sensors, switches, timers, or input devices in other embodiments. For example, detector 47 may comprise a pull-up switch, a pull-down switch, a differential switch, an ohmmeter, or an ammeter. With reference to the eyewear device to which the control system 40 relates, it is to be understood that the detector 47 may be or may include a light sensor positioned to receive light transmitted through the assembly 46 and towards the eye of the person wearing the eyewear device. In an embodiment, the light sensor is positioned behind the assembly 46, that is, in-between the assembly 46 and the face of the person wearing the eyewear device.

As shown in FIG. 4, the controller 48 comprises a processor 48*b* for processing the encoded statements and instructions on the memory 49, and an input/output module 48*a* (hereinafter "I/O module") for receiving a detector output signal 50 from the detector 47, and communicating the signal 50 to the processor 48*b*, and also for controlling the switching circuitry 44 via control input 51 according to the processed statements and instructions by the processor 48*b*. The switching circuitry 44 also includes load terminals 45 that can apply a voltage (for example, from the power supply 42 as a source) across the assembly 46's terminals in response to the control input 51 from the I/O module 48*a*. Switching circuitry 44 may comprise, for example, an H-bridge capable of applying a forward and reverse voltage across load terminals 45, as well as open and—short-circuiting the load terminals 45.

As will be discussed in further detail below, the control system 40 may be used to control and transition the assembly 46 between various operative states, including: transitioning the assembly 46 to a dark state by shorting or open circuiting its terminals together, using a detector 47 to monitor and control the assembly 46's operative state, placing the assembly 46 in an intermediate state or transitioning at a slower rate by applying a pulse width modulated signal, and transitioning the assembly 46 to a light state by applying voltage signal comprising alternating voltage polarities.

While the present disclosure references operative states of the assembly 46 as simply "dark", "light", or "intermediate", the optical transmittance or clarity of the assembly 46 in particular states may also vary according to specific embodiments. For example, the 'dark' state in one embodiment may refer to a transmittance of 5%, whereas in another embodiment the 'dark' state may refer to transmittance anywhere in the range of 0% to 15%. In another example, the assembly 46 may be optically clear when in the 'light' state in one embodiment and only relatively transparent in another embodiment.

The control system 40 of FIG. 4 is operable to apply a portion of the supply voltage received at the input voltage terminals 43 across the load terminals 45 to transition the assembly 46 to a light state, and is also capable of transitioning the assembly 46 to a dark state by open or short circuiting the load terminals 45, based on feedback received from the detector 47. The detector 47 detects any sensory input 41, and in response produces a detector output signal 50 that is sent to the I/O module 48*a* of the controller 48. Sensory input 41 may, for example, comprise a button push, an environmental (luminosity) change, a resistance or transmission measurement of the assembly 46, a timer signal, or a clock signal. In an embodiment in which the detector 47 is an input device, such as, a switch or button, the sensory input 41 may be a user flipping the switch or pushing the button to indicate that the user wants the assembly 46 to transition to a certain state (e.g. dark or light state). In an embodiment in which the detector 47 is a light sensor, the sensory input 41 may be a luminosity reading that is high enough that a user would want the assembly 46 to automatically transition from the light state to the dark state to block the transmission of light. The light sensor may be positioned behind the assembly 46, that is, in-between the assembly 46 and the face of the person wearing the eyewear device to which the control system 40 is coupled. In an embodiment in which the detector 47 is a timer or a clock, the sensory input may be a triggering event, such as the timer indicating that a predetermined period has elapsed, or the clock indicating that the time for transitioning the assembly 46 has been reached.

Processor 48*b*, through the I/O module 48*a*, receives and processes the detector output signal 50, and controls the switching circuitry 44 via the control input 51 to place the assembly 46 into a desired state. For example, in an embodiment where the detector 47 is a light sensor and the detector output signal 50 is a luminosity reading, the processor 48*b* may compare the luminosity reading to a maximum luminosity threshold, which if exceeded, means that the luminosity reading is too high and that the assembly 46 should be transitioned to the dark state ("darkened"). Accordingly, the processor 48*b* through I/O module 48*a* configures the switching circuitry 44 to open or short circuit the load terminals 45 to darken the assembly 46.

In another embodiment, if the processor 48*b* determines through detector output signal 50 that the assembly 46 should be in the light state, the processor 48*b*, through the use of the I/O module 48*a*, configures the switching circuitry 44 such that at least a portion of the voltage received from the input voltage terminals 43, sufficient to transition the filter to the light state (a "threshold voltage"), is applied across its load terminals 45 to thereby lighten the assembly 46. For example, in an embodiment where the detector 47 is a light sensor and the detector output signal 50 is a luminosity reading, the processor 48*b* may compare the luminosity reading to a minimum luminosity threshold; if the luminosity reading is lower than the minimum luminosity threshold, there is insufficient light and the processor 48*b* will transition the assembly 46 to the light state. The light sensor may be positioned behind the assembly 46, that is, in-between the assembly 46 and the face of the person wearing the eyewear to which the control system 40 is coupled. The magnitude of the threshold voltage to lighten or transition the assembly 46 varies according to the particular switching material used, and may also be affected by extrinsic factors. In a particular embodiment, the threshold voltage is in the range 0.6-2.5 volts, but may also range from 0.1 to 10V in other embodiments.

In other embodiments (not shown), the processor 48*b* may apply a voltage signal comprising a plurality of different voltage levels, to transition the assembly 46 to the light state. For example, the signal may comprise a first pulse at a first voltage level, followed by a second pulse at a second voltage level; the first voltage level may be higher than the second voltage level to more quickly charge the assembly 46's electrodes and establish the required electric field, and shorten the fading time of assembly 46 compared to applying the second pulse alone.

In some instances, it may be desirable to achieve a relatively longer transition time from the light state to the dark state. In this case, the controller 48 may instead open circuit (i.e. electrically uncouple) the load terminals 45 so that accumulated charge on the assembly 46's terminals may naturally dissipate, allowing for ambient light shining on the assembly 46 to automatically darken it. For example, when the processor 48b determines using the detector output signal 50 that the assembly 46 should be in the dark state, the processor 48b through I/O module 48a may open circuit the load terminals 45 so that it can be automatically darkened through exposure to ambient light. However, if a relatively quicker transition time to the dark state is desired, the processor 48b may instead, through I/O module 48a, short circuit the load terminals 45 to help dissipate any residual charge differential accumulated between the assembly 46's terminals.

Figure 3A:
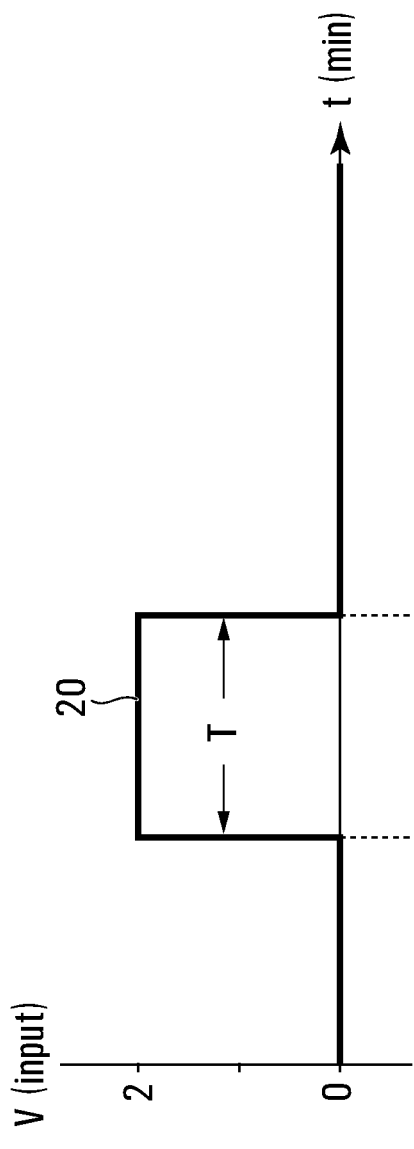
FIG. 3A illustrates a rectangular pulse voltage signal.
Figure 3B:
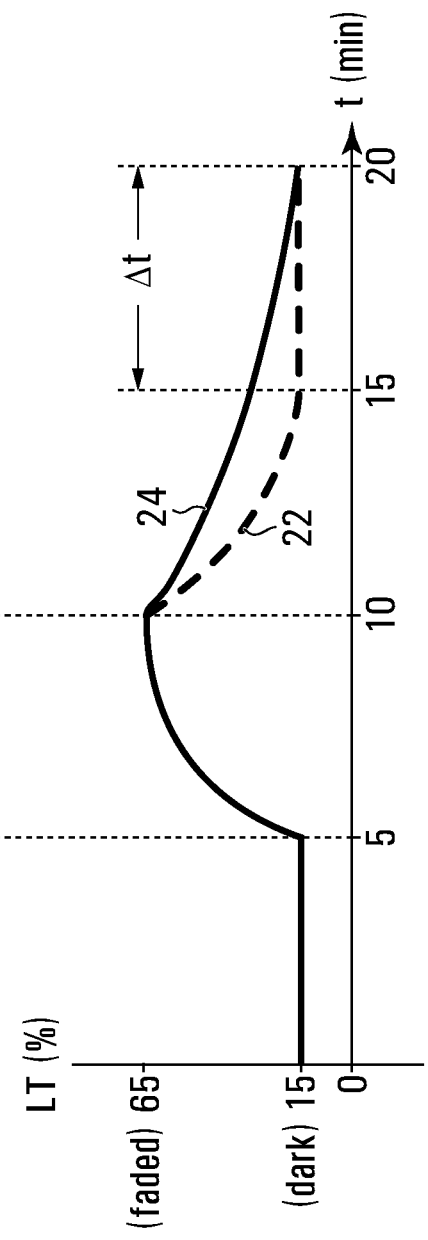
FIG. 3B illustrates the light transmittance of an optical filter assembly in response to the rectangular pulse voltage signal of FIG. 3A when the optical filter assembly's terminals are subsequently open circuited (solid line) and short circuited (dashed line), according to an embodiment.

FIGS. 3A and 3B are embodiments showing the difference between open circuiting the load terminals 45 and short circuiting the load terminals 45 when transitioning the assembly 46 to the dark state. FIG. 3A shows an input waveform comprising a rectangular pulse voltage signal 20 for initially biasing the assembly 46 to a light state, while FIG. 3B shows the transmittance response of the assembly 46 to the rectangular pulse voltage signal 20, and when the assembly 46 is open and short circuited following the pulse voltage signal 20. In this example, there is sufficiently intense light shining on the assembly 46 to transition the assembly 46 to the dark state in the absence of an applied voltage. Accordingly, the assembly 46 is in the dark state from t=0 min to t=5 min. From t=5 min to t=10 min, when the voltage signal 20 is applied across the assembly 46's terminals, the assembly 46 transitions towards the fully light state (which is about 65% light transmittance in this embodiment). At t=10 min the rectangular pulse voltage signal 20 ends. From t=10 min onwards, the solid line 24 illustrates the transmittance of the assembly 46 when the load terminals 45 of the switching circuitry 44 are open circuited, while a dashed line 22 illustrates the transmittance of the assembly 46 when the load terminals 45 of the switching circuitry 44 are short circuited. As shown by the solid line 24, when the load terminals 45 are open circuited, the transmittance gradually decreases until the dark state (about 15% light transmittance in this embodiment) is reached at about 20 min. However, as shown by the dashed line 22, when the load terminals 45 are shorted together, residual accumulated charge is more quickly dissipated allowing the assembly 46 to transition to the dark state faster. In this example the assembly 46 reaches the dark state at about 15 minutes when its terminals are shorted, and the required time for transitioning from the light state to the dark state is reduced by about 5 minutes (Δt).

While FIGS. 3A and 3B illustrate the transmittance response of the assembly 46 according to a particular embodiment, the response may vary in other embodiments according to the switching material used and other extrinsic or physical factors. For example, a greater intensity of ambient light shining on the assembly 46 may require a higher amplitude voltage pulse in order to transition the assembly to the light state. Also, the response of the assembly 46 may vary over its lifetime, or based on how often the assembly 46 is switched. For instance, built-up charge over successive cycles of the assembly may cause the darkening process (and transition times) to become slower and slower. In some embodiments, after a few cycles, it may become difficult or impossible to transition the assembly 46 to the dark state without shorting its terminals for a period of time to allow the electric charge in the assembly 46 to dissipate.

Further, while the assemblies 46 in the depicted embodiments comprise hybrid photochromic/electrochromic switching materials, the controller 48 may also short circuit load terminals 45 when coupled across assemblies 46 comprising other switching materials, such as SPD and electrochromics. In the case of SPD for example, a voltage may be applied to align the particles of the assembly 46 to thereby allow light to pass (light state); when the voltage is removed, the particles assume a random pattern which scatters incident light (dark state). In this case, shorting the load terminals 45 can also help dissipate the charge accumulated on the electrodes to speed up the transition to the dark state.

In an example where the switching material is electrochromic, the assembly 46 is typically driven to its dark state by applying voltage of a first polarity across the terminals 45. It is driven back into a light state by either applying a reverse polarity across the terminals 45, or simply removing voltage from the terminals 45 for a long period of time. Shorting the terminals 45 can help speed up the fading time of some electrochromic-based assemblies 46 by allowing accumulated charge on electrode terminals to quickly dissipate without having to apply a reverse voltage, which therefore also reduces power consumption.

Polarity Switching

The following description refers to control systems and methods; however, it is to be understood that the control systems and methods are for use with an eyewear device. As such, the control system and methods are considered eyewear control systems and methods. FIGS. 1A to 1F and 2 indicate possible ways in which the control systems and methods may be applied to an eyewear device.

Figure 15:
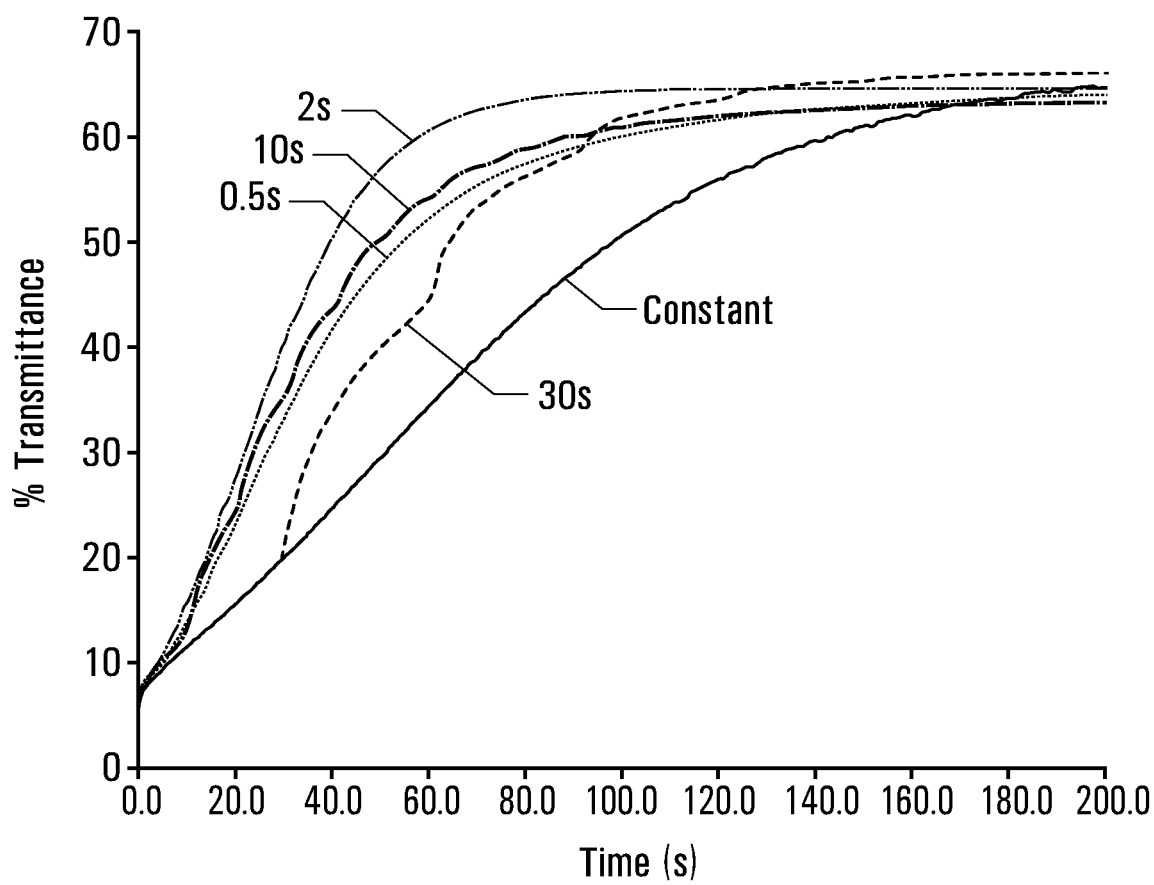
FIG. 15 is a plot illustrating light transmittance of an eyewear optical filter assembly in response to i) a constant voltage input, and voltage input signals with polarity reversal cycles of ii) 0.5 seconds, iii) 2 seconds, iv) 10 seconds, and v) 30 seconds, according to an embodiment.

In certain embodiments, the control system 40 may be used to switch or alternate polarity of the voltage applied across the assembly 46 one or more times when fading the assembly 46 (i.e. transitioning from dark to light states). Polarity switching may help decrease the fading time required to transition from the dark state to the light state. For example, FIG. 15 illustrates the assembly 46's transmittance response when a constant voltage is applied (no polarity switching), compared to when the polarity is switched at 0.5 s, 2 s, 10 s and 30 s switching intervals (i.e. voltage across the anode and cathode of the assembly is periodically reversed at each given interval). For a switching interval of duration x seconds, the applied voltage switches between positive and negative polarities every x seconds. In this example, the assembly 46 demonstrated a luminous transmittance ($LT_A$) of about 5-6% when in the dark state. When a continuous voltage was applied (no polarity switching), the transition time to lighten to 60% $LT_A$ was about 140 s. When voltage was applied using polarity switching at 30 s, 10 s, or 0.5 s switching intervals, the transition time to achieve 60% $LT_A$ was reduced to about 100 s. Finally, when voltage was applied using polarity switching at a 2 s switching interval, the time to achieve 60% $LT_A$ was further reduced to about 50 s. Accordingly, it can be seen that in certain embodiments, the use of polarity switching can beneficially reduce the fading time of the assembly 46.

While the above embodiments depict nearly instantaneous polarity switching (e.g. the polarity was switched without applying an intermediate voltage across the assembly 46), other embodiments may comprise applying no voltage (open circuit), a short circuit, or a low intermediate voltage between polarity switches. For example, an open circuit may be applied for a short period of time (e.g., 0.1 to 5 seconds) across the assembly 46 between a transition from a forward voltage to a reverse voltage. This would have the effect of slowing the fading time, but potentially increases electrical durability of certain switching materials. In other embodiments, the duration between polarity switches is varied over the entire fading cycle. For example, the time period spent in an open circuit during polarity switching is shorter at the start of the fading cycle (e.g., 1 second) to enhance the initial change in light transmission, and then increases to a longer period (e.g., 3 seconds) by the end of the fading cycle.

Alternative Control System Embodiments

The following description refers to control systems and methods; however, it is to be understood that the control systems and methods are for use with an eyewear device. As such, the control system and methods are considered eyewear control systems and methods. FIGS. 1A to 1F and 2 indicate possible ways in which the control systems and methods may be applied to an eyewear device.

Figure 5:
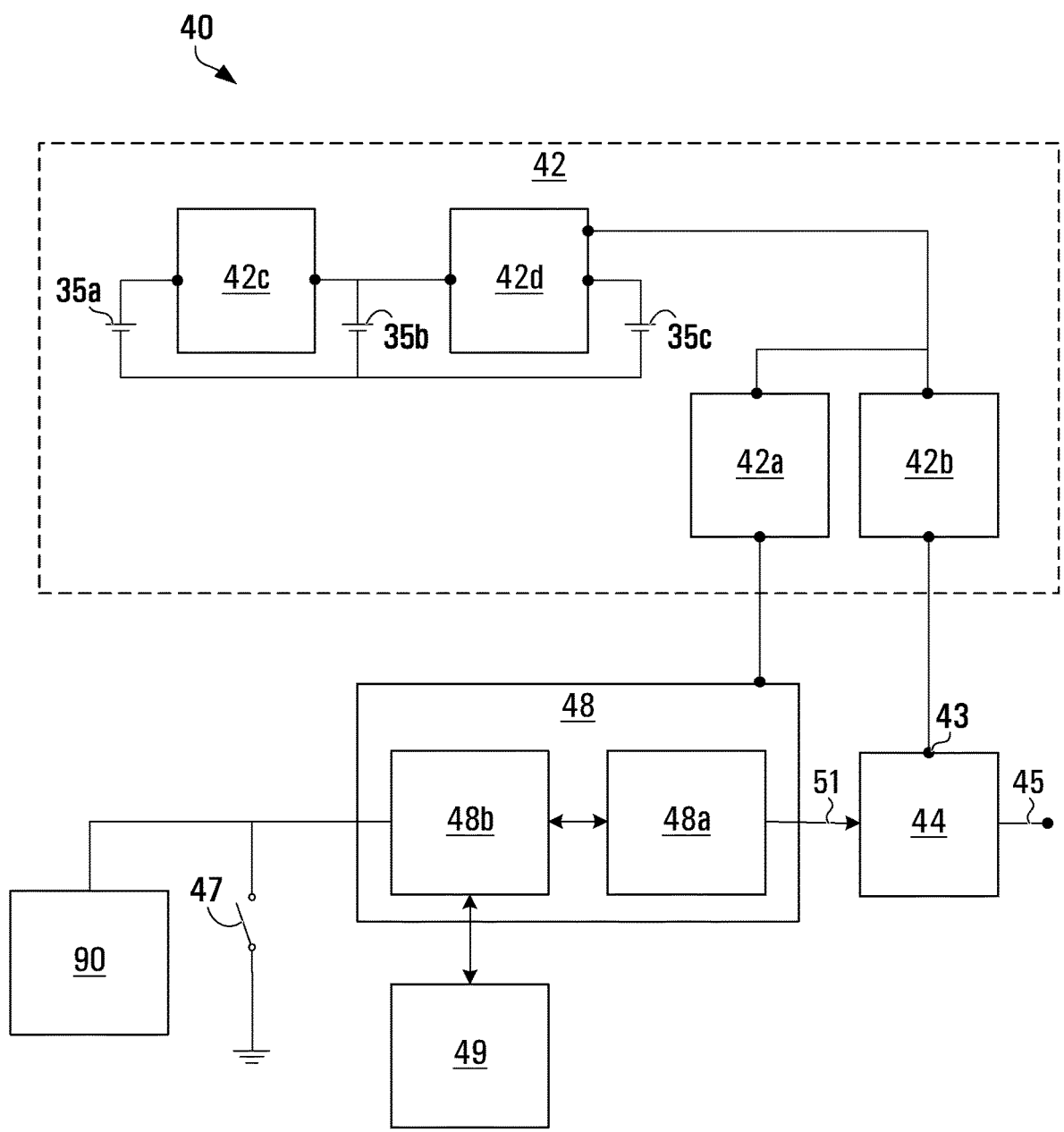
FIGS. 5 and 6 are block diagrams illustrating embodiments of non-feedback eyewear control systems.

Referring now to FIG. 5, there is shown an embodiment of the control system 40. As shown in FIG. 5, the power supply 42 comprises two DC power sources 35a and 35b, and a battery or other energy storage device 35c. The power supply 42 also comprises a battery charger 42d and voltage regulators (42a, 42b, 42c) in order to provide regulated power across the input voltage terminals 43 of the switching circuitry 44 and to the controller 48. The controller 48 could receive input signals from a light sensor 90 or a switch 47. The switching circuitry 44 is an H-Bridge, which can apply voltage from the input voltage terminals 43 across the load terminals 45 in a forward or reverse polarity, or short or open circuit the load terminals 45.

While the above embodiment depicts a light sensor 90 in parallel with a switch 47, it is to be understood that in some other embodiments, the light sensor 90 could be provided in series with the switch 47. Where the light sensor 90 is provided in parallel with the switch 47, it is to be understood that the switch 47 may provide a manual override to the light sensor 90. Where the light sensor 90 is provided in series with the switch 47, it is understood that both the switch 47 and light sensor 90 signals need to meet specific criteria for the controller 48 to respond. With reference to the eyewear device to which the control system 40 relates, it is to be understood that the light sensor 90 is positioned to receive light transmitted through the assembly 46 and towards the eye of the person wearing the eyewear device. In an embodiment, the light sensor 90 is positioned behind the assembly 46, that is, in-between the assembly 46 and the face of the person wearing the eyewear.

The power source 35a along with the voltage regulator 42c allow the power supply 42 to be connected to multiple sources such as architectural 120 VAC and computer electronic 5 VDC. Depending on the size of the assembly 46 (not shown) that may be coupled to the load terminals 45, it may be possible to remove power source 35a and voltage regulator 42c, and power the control system 40 through only power source 35b, which could be a solar cell. This would allow the control system 40 and assembly 46 to operate without external wiring.

Figure 11:
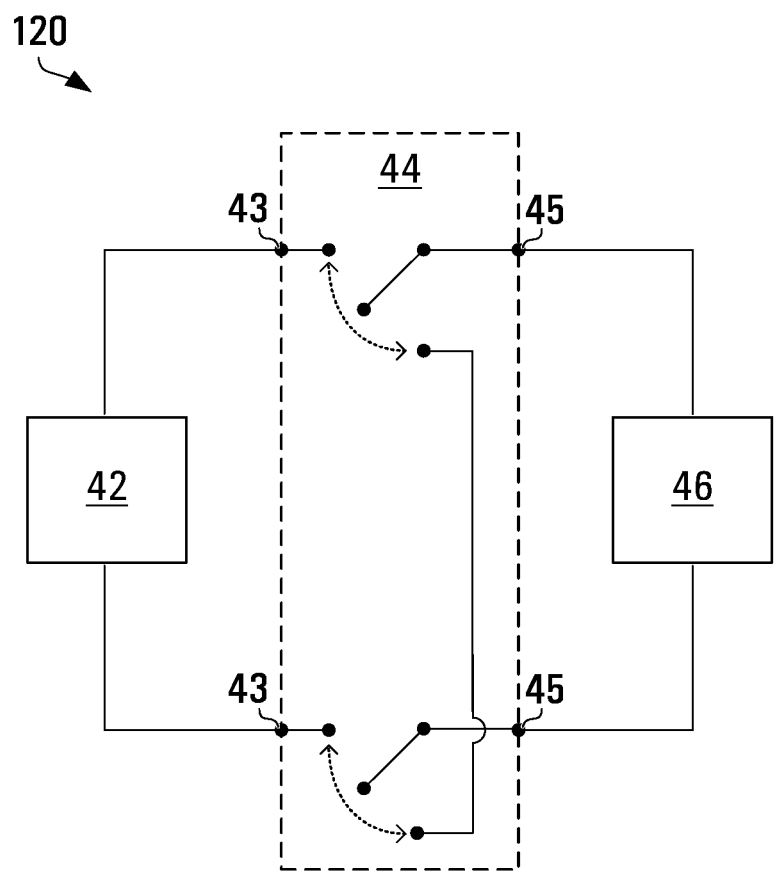
FIG. 11 is a block diagram of the eyewear optical filtering system comprising switching circuitry in the form of a double pole, double throw (DPDT) switch, according to an embodiment.

In other embodiments of the power supply 42 (not shown), power source 35a, and switch 47 need not be connected to ground (for example, see FIG. 11). Further, power sources 35a and 35b may be directly connected to voltage regulators 42a and 42b. If the voltage requirements for the switching circuitry 44 and the controller 48 are similar, regulators 42a and 42b may be replaced by a single voltage regulator to power the controller 48 and supply electricity to the assembly 46. In another embodiment (not shown), a third voltage regulator is positioned in parallel with regulator 42b and set to a higher voltage than 42b. The third voltage regulator may be initially turned on to quickly lighten the assembly 46, with regulator 42b subsequently applied for holding the assembly 46 at a given transmittance thereafter. By employing a dual-voltage configuration, fading time may be reduced without necessarily sacrificing durability or longevity of the assembly 46.

Figure 9A:
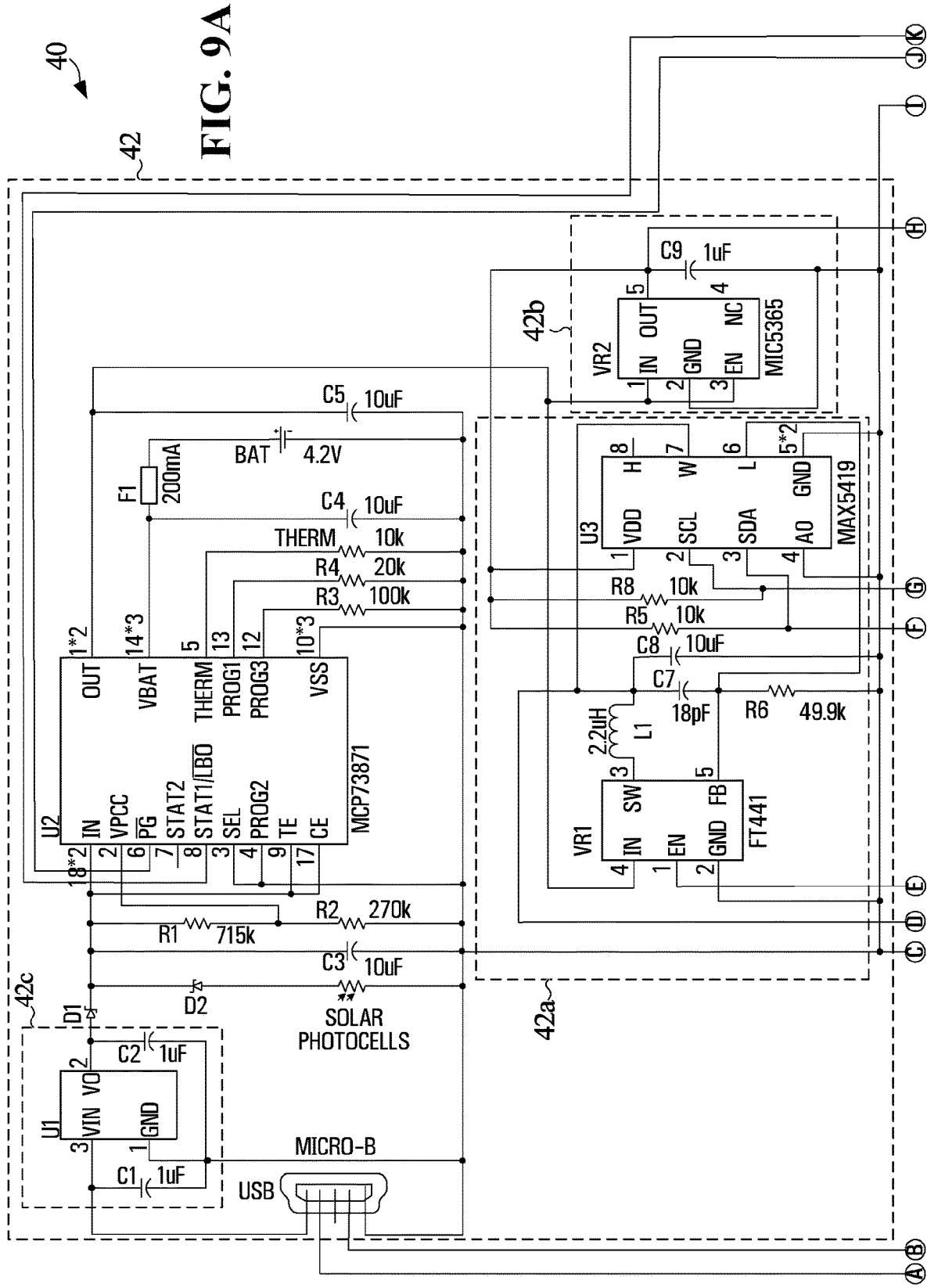
FIGS. 9A and 9B collectively show a circuit schematic of the eyewear control system of FIG. 5, according to an embodiment.
Figure 9B:
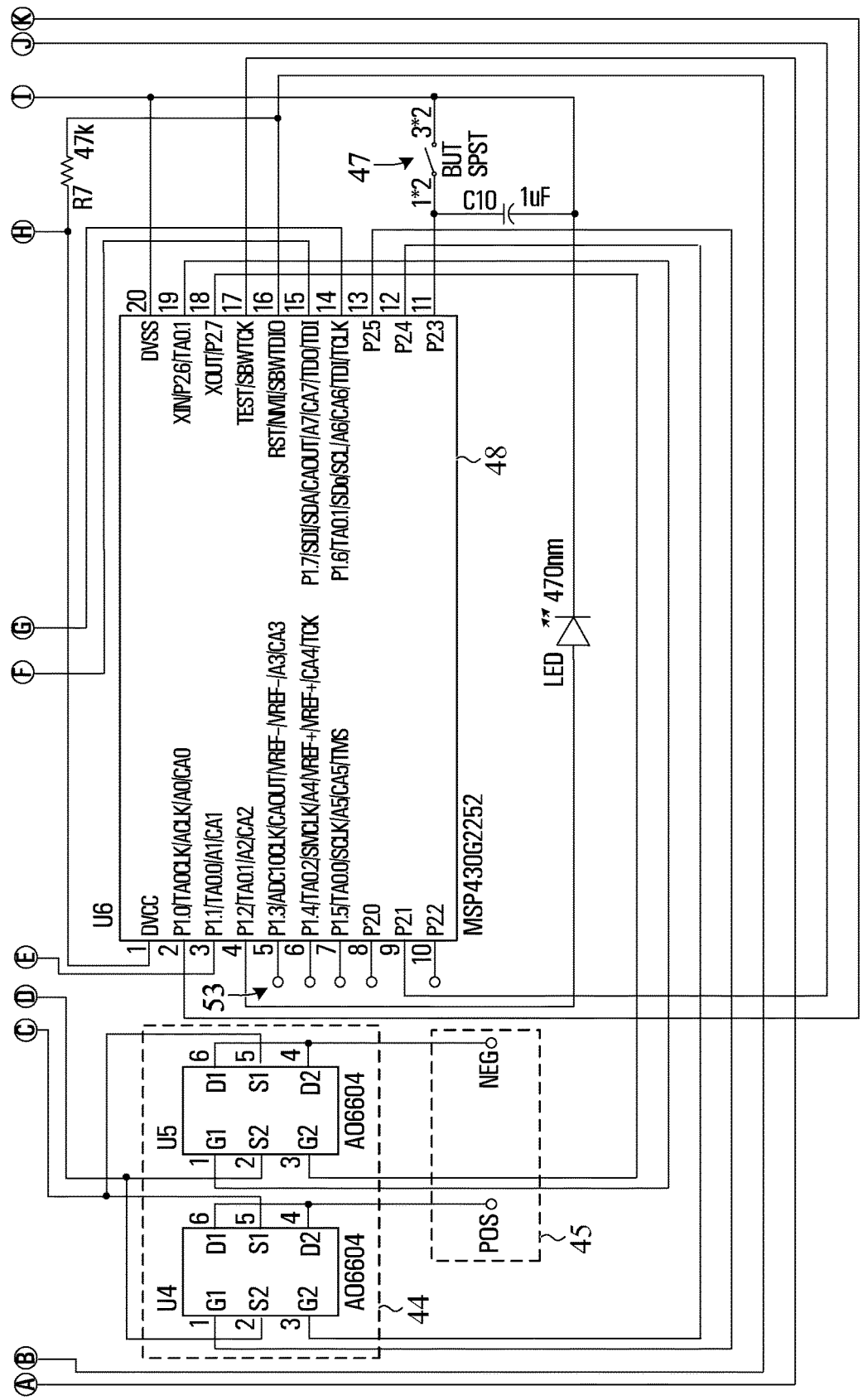

FIGS. 9A and 9B show a circuit diagram of the control system 40 of FIG. 5, according to an embodiment. A charger implemented with a Microchip Technology™ MCP73871 microchip receives a power source, a voltage regulator 42a is implemented with an ON Semiconductor™ NCP1529 switching regulator to power the switching circuitry 44, and another voltage regulator 42b is implemented with a Micrel Inc.™ MIC5365 linear regulator circuit for powering the controller 48; these devices are electrically coupled together as shown in FIGS. 9A and 9B to form the power supply 42. In other embodiments, voltage regulator 42a may be any voltage regulator that provides the desired input and output voltage ranges. For example, if a wider output range is desired, a Fremont Micro Devices™ FT441 voltage regulator may be alternatively used to provide an output range of 0.6V-5.5V. The switching circuitry 44 in this embodiment comprises an H-bridge implemented by two electrically coupled Alpha and Omega Semiconductor™ AO6604 MOSFET circuits, while the controller 48 comprises a Texas Instruments™ MSP430G2452 microcontroller that incorporates a processor 48b, memory 49 and I/O module 48a into one unified package. An unused input pin 53 on the controller 48 can be coupled to a light sensor 90 (not shown) for receiving the detector output signal 50, while the assembly 46 can be coupled to the load terminals 45 of the switching circuitry 44. In this embodiment, the power source feeding the power supply 42 may comprise a range of DC voltages; for example, the DC voltage can range from about 5 Volts (e.g., from a USB source) up to 12 Volts. However, other embodiments may accept voltages of different ranges. Additionally, in other embodiments, the power source can be a regulated power source such that any of the charger or voltage regulators 42a, 42b may accordingly be omitted from the power supply 42.

Figure 6:
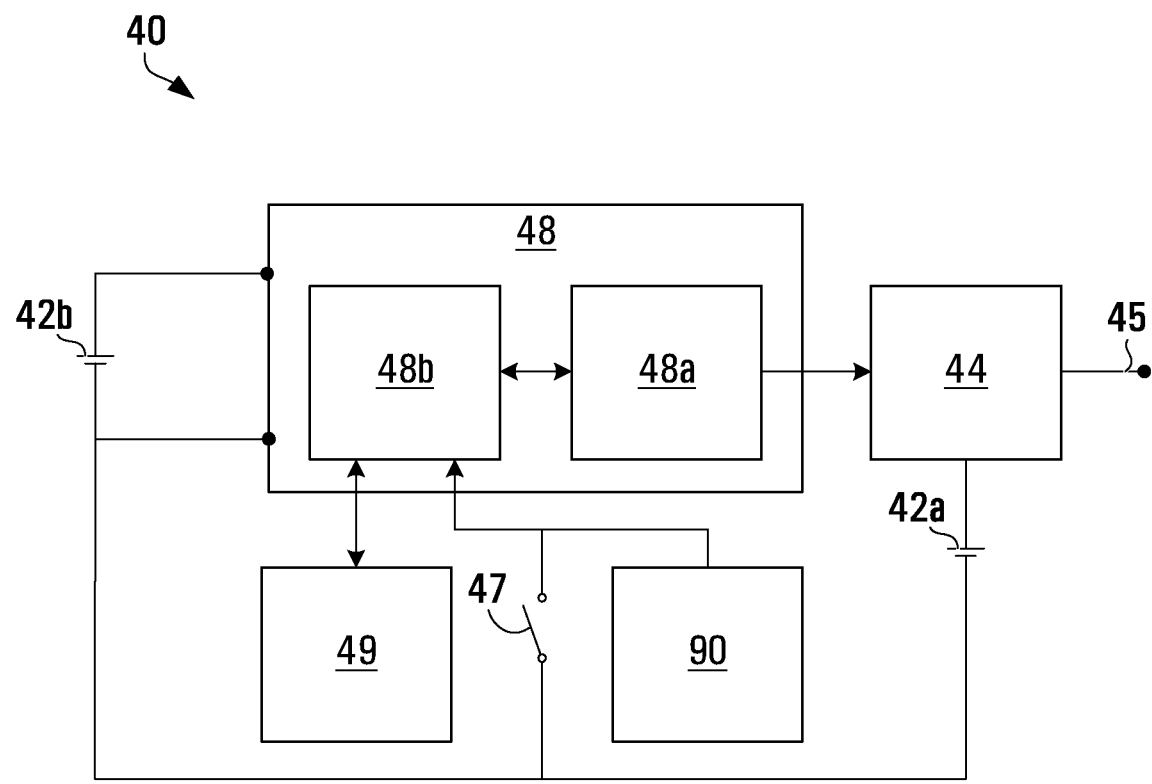

Referring now to FIG. 6, there is shown an embodiment of the control system 40 in which the switching circuitry 44 is an H-bridge, and the input signal to the controller 48 can be from a light sensor 90 or switch 47 in this configuration. With reference to the eyewear device to which the control system 40 relates, it is to be understood that the light sensor 90 is positioned to receive light transmitted through the assembly 46 and towards the eye of the person wearing the eyewear device. In an embodiment, the light sensor 90 is positioned behind the assembly 46, that is, in-between the assembly 46 and the face of the person wearing the eyewear device. The power supply 42 comprises a pair of DC power sources 42a, 42b, each of which provides voltage to one of the H-bridge and the controller 48. The H-bridge switching circuitry 44 allows voltage to be applied across the load terminals 45 in forward or reverse polarity, and also allows the load terminals 45 to be open or short circuited according to the desired control of the assembly 46. In other embodiments, if the threshold voltage of the assembly 46 is comparable to the operating voltage of the controller 48, then DC power sources 42a and 42b may be replaced by a single voltage regulator.

Figure 7:
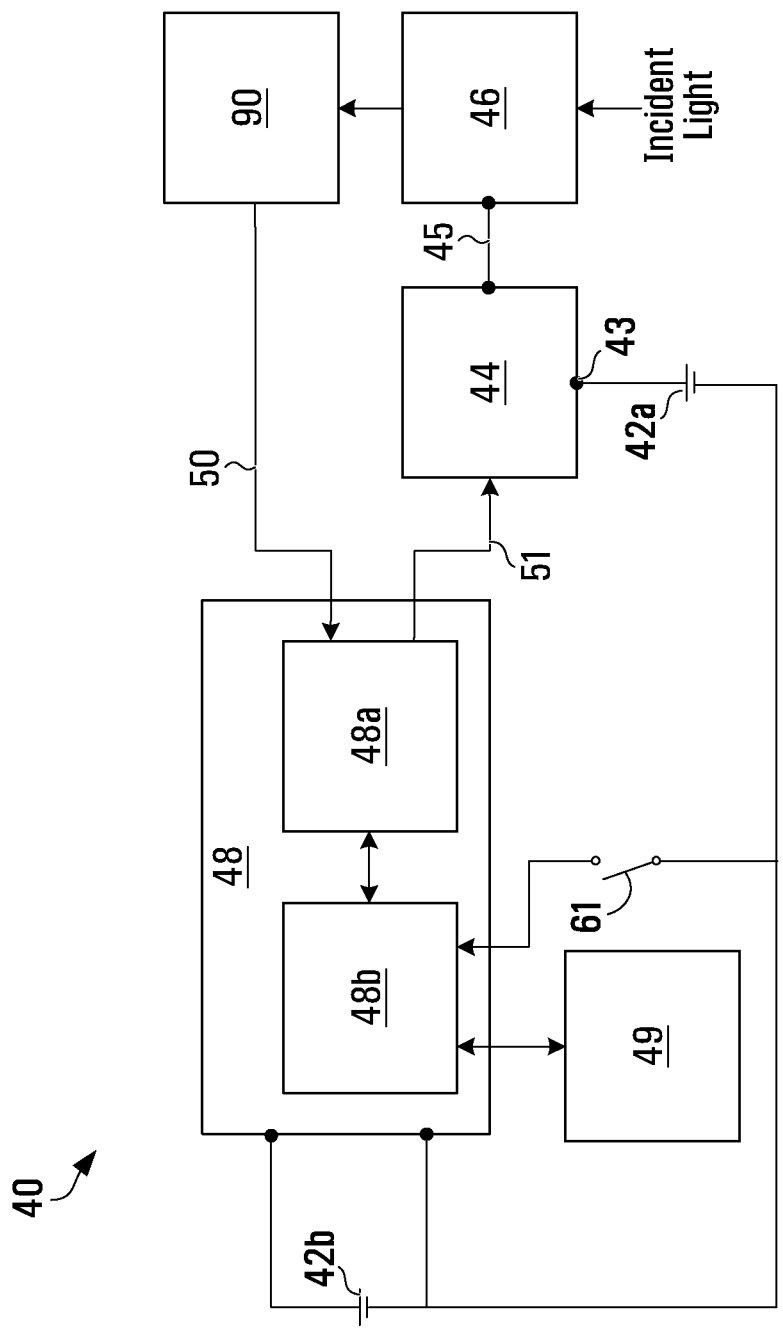
FIG. 7 is a block diagram illustrating an embodiment of an adaptive eyewear control system.
Figure 8:
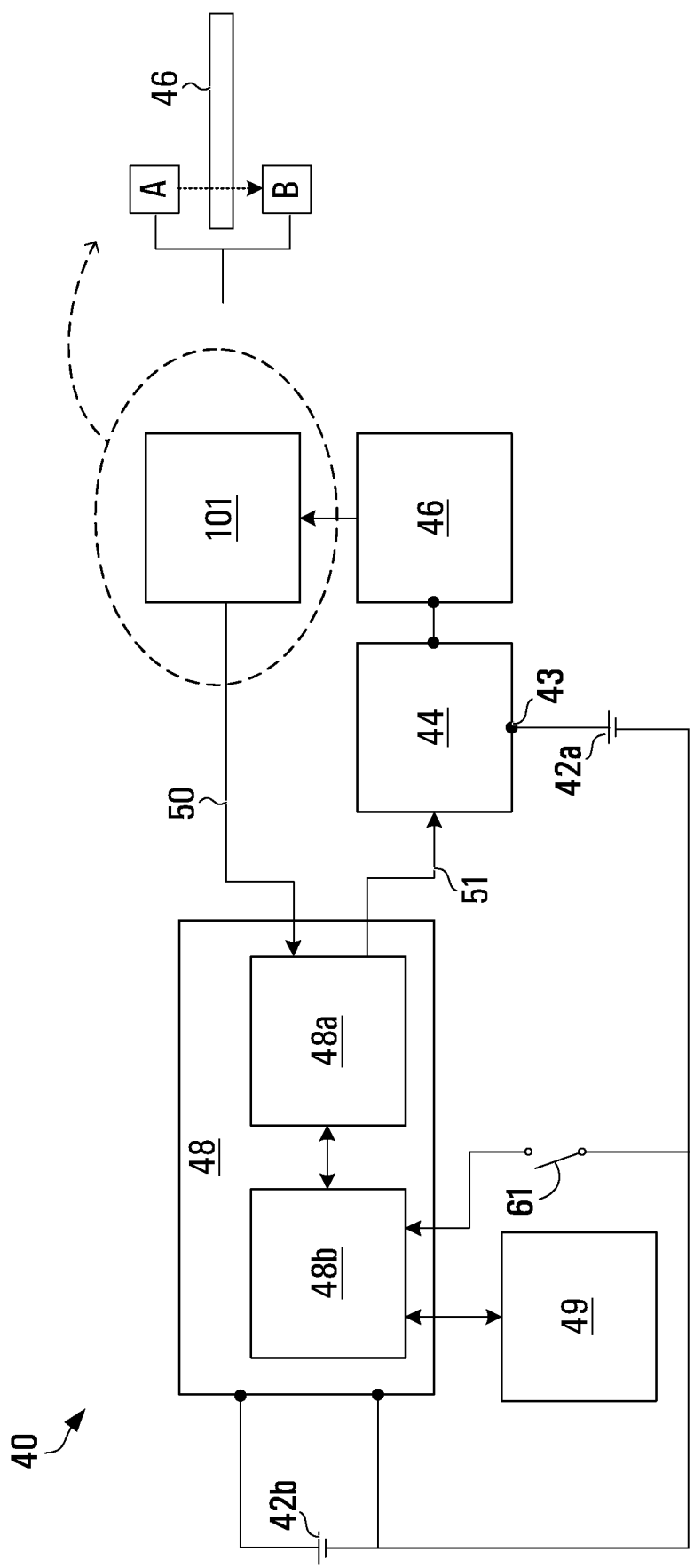
FIG. 8 is a block diagram illustrating an embodiment of a closed-loop eyewear control system.

Referring now to FIG. 7, there is shown an embodiment of the control system 40 that is somewhat similar to the control system 40 of FIG. 6. However, the embodiment differs in that the control system 40 of FIG. 7 is setup for adaptive control of the assembly 46 based on light transmitted through the assembly 46. In this configuration the detector comprises a combination of a light sensor 90 and a switch 61 (i.e. an input device). With reference to the eyewear device to which the control system 40 relates, it is to be understood that the light sensor 90 is positioned to receive light transmitted through the assembly 46 and towards the eye of the person wearing the eyewear device. In an embodiment, the light sensor 90 is positioned behind the assembly 46, that is, in-between the assembly 46 and the face of the person wearing the eyewear. The adaptive configuration of the control system 40 advantageously allows the controller 48 to more precisely control the assembly 46 in view of lighting conditions at the eye of the person wearing the eyewear device using the light sensor output signal 50. For example, by suitably programming instructions on the memory 49, the controller 48 is configured to automatically control the switching circuitry 44 to short circuit or open circuit the load terminals 45 if the light sensor 90 indicates that light at the eye exceeds a certain threshold (e.g. the light hitting the eye is too bright), or otherwise have the switching circuitry 44 apply a voltage across the load terminals 45 if the light at the eye does not exceed the threshold (e.g. the light hitting the eye is too dark). The switch 61 may be used by a user to indicate to the controller 48 whether a light state is desired, in which case a voltage is applied across the load terminals 45, or whether a dark state is desired, in which case the terminals 45 are shorted together or open circuited. In alternative embodiments, the switch 61 may perform other functions (e.g.: instruct the processor 48 to disregard the detector output signal 50 and instead transition between the light and dark states based solely on an internal timer or a look-up table). Further, when applying voltage across the load terminals 45, the switching circuitry 44 can apply a forward or reverse voltage. Applying a reverse voltage to the assembly 46, as discussed above and shown in FIG. 15, may also improve the transitional times between different states, or improve the longevity of the assembly 46. This because a reverse voltage can potentially prevent a buildup of deposits from accruing onto a single electrode that would otherwise occur from applying only a forward voltage. FIG. 8 shows an embodiment of a control system 40 similar to the control system 40 shown in FIG. 7, but instead setup in a closed-loop configuration instead of an adaptive configuration. Closed-loop configuration allows for direct measurement of the transmittance of the assembly 46, as opposed to an adaptive configuration which provides an inference or estimation of the assembly 46's transmittance. In this way, the closed-loop configuration more accurately controls and adjusts transmission of light through the assembly 46. By detecting when the assembly 46 has transitioned into a light, dark, or desired intermediate state, the control system 40 can promptly remove or apply voltage to the assembly 46 in order to maintain the desired transmittance while reducing power consumption.

As shown in FIG. 8, the detector 47 comprises a light transmission meter 101 that detects the actual transmittance of the assembly 46. The light transmission meter 101 may comprise a lighting element A, and a light sensor B that measures the light transmitted through the assembly 46 by lighting element A. With reference to the eyewear device to which the control system 40 relates, it is to be understood that the light sensor B is positioned to receive light transmitted through the assembly 46 and towards the eye of the person wearing the eyewear. In an embodiment, the light sensor B is positioned behind the assembly 46, that is, in-between the assembly 46 and the face of the person wearing the eyewear. The detector output signal 50 thus comprises a differential measurement that is sent from the light transmission meter 101 to the controller 48. In this way, and as discussed below in further detail, the processor 48b through the I/O module 48a can control the switching circuitry 44 based on the actual transmittance (or state) of the assembly 46. In another embodiment (not shown), the light transmission meter 101 comprises two light sensors on opposite sides of the assembly 46. Incident ambient light shone on the assembly 46 is received by both detectors, and a differential measurement is provided based on the amount of incident light that passes through the assembly 46 compared to the total incident light. In this way, the transmittance of the assembly 46 can be adjusted according to the ambient lighting conditions surrounding the assembly 46.

"AUTO Mode Operation" Using Duty Cycle Control

The following description refers to control systems and methods; however, it is to be understood that the control systems and methods are for use with an eyewear device. As such, the control system and methods are considered eyewear control systems and methods. FIGS. 1A to 1F and 2 indicate possible ways in which the control systems and methods may be applied to an eyewear device.

A pulse width modulated signal may be applied across the assembly 46's terminals to control its transmittance at an intermediate state (or a certain average value), corresponding to an operative state between the fully light and dark states. The pulse width modulated signal may comprise a plurality of voltage pulses.

In an embodiment, a duty cycle of at least one of the voltage pulses may be set or varied (i.e. changed) in order to set or vary (i.e. change) an amount of light transmitted through the assembly 46. As embodiments relate to an eyewear device, varying the duty cycle in this manner varies the amount of light transmitted to the eye of a person wearing the eyewear device. In this way, the amount of light hitting the person's eye can be controlled by controlling the duty cycle of the voltage pulses of the pulse width modulated signal.

Figure 16:
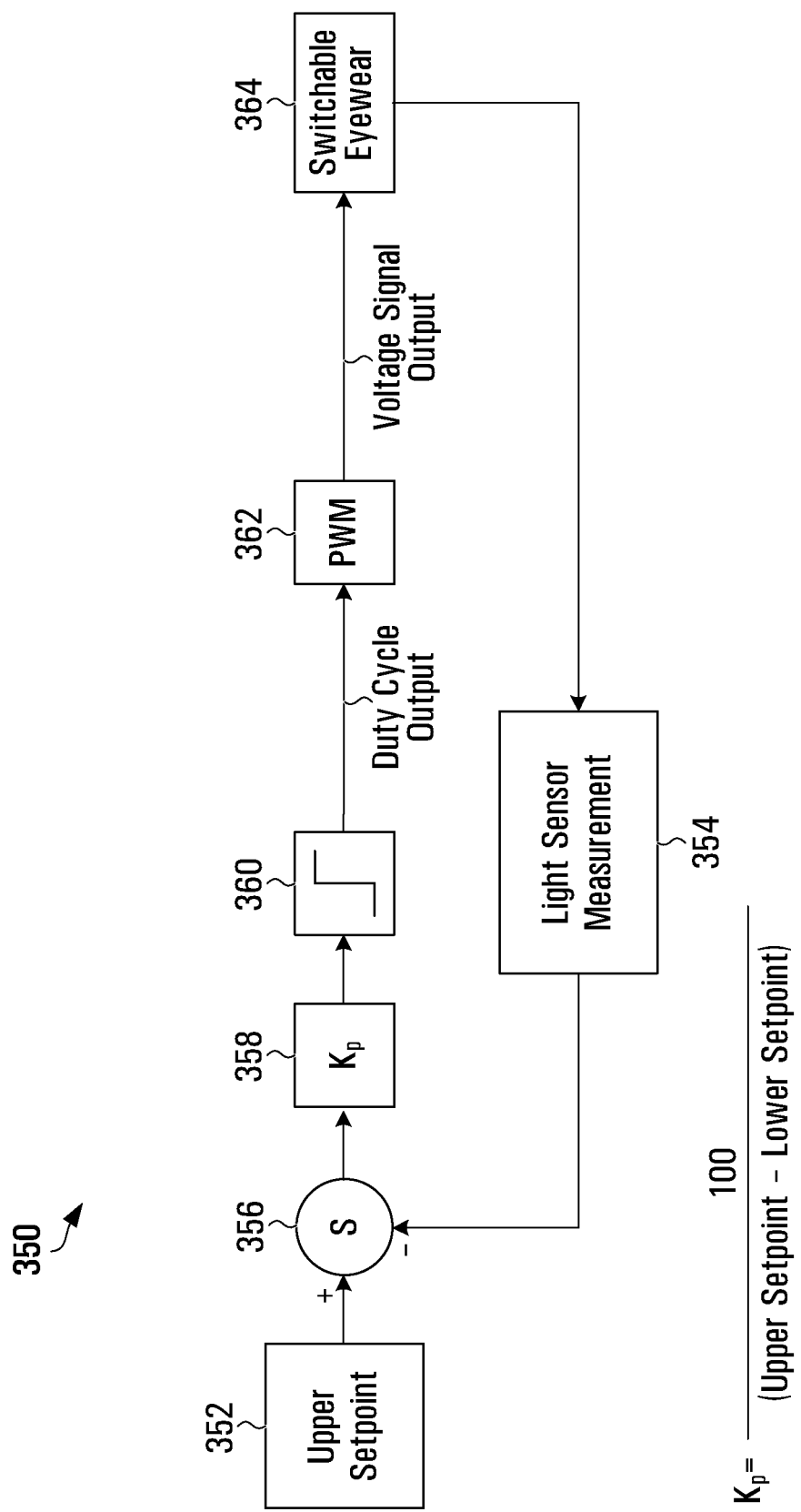
FIG. 16 is a block diagram illustrating a control method in accordance with an embodiment.

FIG. 16 illustrates a control method 350 of the assembly 46 in accordance with an embodiment. The following description will be provided with reference to the embodiment of FIG. 7; however, it is to be understood that the control method 350 is not limited to the embodiment of FIG. 7 and applies equally to the embodiments of FIGS. 4, 5, 6, 8 and 9A and 9B.

At block 352, the control method 350 receives as an input an upper setpoint. In an embodiment, the upper setpoint is an upper light threshold (e.g. a second threshold). It is to be understood that the upper setpoint may be a luminance value. At block 354, the control method 350 receives as an input a light sensor measurement (e.g. the detector output signal 50) from the light sensor 90. It is to be understood that the light sensor measurement may be a luminance value. With reference to the eyewear device to which the control system 40 relates, it is to be understood that the light sensor 90 is positioned to receive light transmitted through the assembly 46 and towards the eye of the person wearing the eyewear. In an embodiment, the light sensor is positioned behind the assembly 46, that is, in-between the assembly 46 and the face of the person wearing the eyewear. In this way, the detector output signal 50 from the light sensor 90 provides an accurate representation of the amount of light hitting (i.e. incident upon) the person's eye. At block 356, the upper setpoint of block 352 and the light sensor measurement of block 354 are compared and the difference between them is determined. At block 358, a gain '$K_p$' is applied to the difference generated in block 354. In an embodiment, the gain is based on the upper setpoint and a lower setpoint. In an embodiment, the lower setpoint is a lower light threshold (e.g. a first threshold). It is to be understood that the lower setpoint may be a luminance value. The lower setpoint may be received by the control method 350 at block 354. In particular, the gain applied in block 358 may be determined as follows:

$$K_p=100/(\text{upper setpoint}-\text{lower setpoint})$$

At block 360, the determined value is clipped. Specifically, the determined value is checked to confirm that it is not below a lower duty cycle limit and, if it is, the determined value is set to the lower duty cycle limit. Additionally, the determined value is checked to confirm that it is not above an upper duty cycle limit and, if it is, the determined value is set to the upper duty cycle limit. The clipped value represents a duty cycle percentage. In particular, the clipped value represents the duty cycle percentage of at least one voltage pulse of the pulse width modulated signal applied across the assembly 46's terminals. That is, if the clipped value is 70, a voltage pulse with a duty cycle of 70% may be generated. Accordingly, at block 362, a pulse width modulated signal is generated with at least one voltage pulse having a duty cycle percentage matching the clipped value. It is to be understood that in some embodiments, the clipped value may not be the duty cycle percentage and, instead, the clipped value may be processed before being used as a duty cycle percentage.

In an embodiment, the voltage pulse produced has a duty cycle exactly matching the clipped value. Alternatively, the voltage pulse produced may have a duty cycle approximating but not precisely matching the clipped value, that is, the duty cycle of the voltage pulse may be within a tolerance of ±5% or ±10%. For instance, the clipped value may be 80, but the duty cycle may be between 76% and 84% or 72% and 88%. For example, due to limitations in components of the control system 40, it may be possible to generate voltage pulses with a duty cycle being one of only a set of discrete values, rather than any value on a continuous scale. For example, it may be possible to produce voltage pulses having a duty cycle which is only a whole number integer value, or even a subset of those values, such as only even values.

In an embodiment, only a single voltage pulse having a duty cycle matching or approximating the clipped value may be generated. In another embodiment, two or more such voltage pulses may be generated. In any case, at block 364, the pulse width modulated signal generated is applied across the assembly 46's terminals in order to control the amount of light transmitted through the assembly 46.

Additional iterations of the control method 350 may be applied such that new voltage pulses are generated and applied across the assembly 46's terminals. In these subsequent iterations, however, the light sensor measurement of block 354 may have changed and, therefore, the voltage pulse generated next may have a different duty cycle. In this way, the control method 350 may adapt the transmittance through the assembly 46 so that the amount of light measured by the light sensor 90 is maintained substantially in an intermediate state (or average value) which is in-between the upper and lower setpoints. In this way, the amount of light measured by the light sensor 90 may be maintained as close as possible to a certain average value and variance based on the ability of the optical filter to attenuate light.

In an embodiment, the control method 350 is modified such that, if the light sensor measurement of block 354 is above the upper setpoint, voltage pulses of the pulse width modulated signal applied across the assembly 46's terminals are set to a first preset duty cycle, such as, for example, a duty cycle of 0%, 5%, or 10%. In other words, under bright light conditions the assembly 46 can transition to the dark state to try to reduce the light sensor measurement in order to try to keep the light measured by light sensor 90 below the upper setpoint. Additionally, if the light sensor measurement of block 354 is below the lower setpoint, voltage pulses of the pulse width modulated signal applied across the assembly 46's terminals may have a second preset duty cycle, such as, for example, a duty cycle of 90%, 95% or 100%. In other words, under low light conditions the assembly 46 can transition to the light state to try to increase the light sensor measurement in order to try to keep the light measured above the lower setpoint. It is to be understood that applying a pulse width modulated signal having voltage pulses with a duty cycle of 0% may be achieved by, for example, applying no voltage across the assembly 46's terminals or shorting the assembly 46's terminals together. For completeness, it is noted that when the light measured by light sensor 90 is between the upper and lower setpoints, the duty cycle is varied in accordance with the control method of 350 in order to try to keep the amount of light measured by the light sensor 90 at an intermediate state in-between the upper and lower setpoints.

The following describes the operation of the control system 350 using a numerical example.

In an embodiment, the upper setpoint is 30, the lower setpoint is 15, the gain upper duty cycle limit is 100 and the gain lower duty cycle limit is 0. It is to be understood that the numbers used in this example are not limiting and are intended to provide an indication of an amount of light. In this example, a value of 360 represents 1 SUN, a realistic brightest light condition, and a value of 0 represents no light. In another embodiment, the values may be actual luminance values. Additionally, in this example, the first preset duty cycle is 0% and the second preset duty cycle is 100%.

The person wearing the eyewear may be skiing on a sunny day and so ambient light may be bright because of direct sunlight and sunlight reflected off of snow. It is noted that direct inbound light versus reflected inbound light results in a huge difference in light sensor 90 sensor readings. A bright sunny scene in dirt compared with snow could result in a light difference reading difference of 5:1 due to the reflection of the snow.

The eyewear device with the eyewear control system may begin in a light state. For example, the person may remove the eyewear device from a case. Under these bright light circumstances, the ambient light may be at 300. Accordingly, the amount of light measured by light sensor 90 (i.e. the amount of light hitting the person's eye) is above the upper setpoint. Therefore, a pulse width modulated signal having voltage pulses with a first preset duty cycle of 0% is applied across the assembly 46's terminals. In this way, the assembly 46 is operated to reduce transmittance of light to the person's eyes, i.e. the assembly 46 is permitted to darken due to the ambient light incident upon it. Even when the assembly 46 is in its fully darkened state, the light measured by the light sensor 90 (i.e. the amount of light hitting the person's eye) may still be above the upper threshold. In this case, the duty cycle of 0% will be maintained.

The person may then experience reduced lighting conditions in one or two different ways.

Firstly, the amount of light detected by the light sensor 90 (i.e. the amount of light hitting the person's eye) may fall below the lower setpoint of 15. For example, the person wearing the eyewear may enter a dimly lit building or forest where ambient light is only 5. Accordingly, a pulse width modulated signal having voltage pulses with a duty cycle of 100% is applied across the assembly 46's terminals. In this way, assembly 46 is operated to avoid reducing transmittance of light to the person's eyes. That is, assembly 46 is operated into the light state.

Secondly, the amount of light detected by the light sensor 90 (i.e. the amount of light hitting the person's eye) may fall less dramatically, for example, due to an increase in cloudcover. For example, the ambient light may fall to 200 meaning that the light measured at light sensor 90 (i.e. the amount of light hitting the person's eye) may fall to 20, which is in-between the upper setpoint of 30 and the lower setpoint of 15. Therefore, at block 356, the difference between the upper setpoint of 30 and the detected light value of 20 is determined as 10. At block 358 a gain of 10 (i.e. Kp=100/(30−15)) is applied to generate a value of 67. At block 360, the value remains unchanged because it is above the gain lower duty cycle limit of 0 and above the gain upper duty cycle limit of 100. Accordingly, at block 362 a pulse width modulated signal is generated having a voltage pulse with a duty cycle of 67%. That is, during 67% of the voltage pulse the assembly 47 is controlled to lighten and during the remaining 33% of the voltage pulse the assembly 47 is allowed to darken. At block 364, this pulse width modulated signal is applied across the assembly 46's terminals. In this way, the transmittance of the assembly 46 is adjusted such that it is at an intermediate state in-between the dark state and the light state.

In an embodiment, it is to be understood that the higher the duty cycle the greater the amount of light which is permitted to pass through the assembly 46 and, therefore, the greater the amount of light which is permitted to pass through the eyewear lens and into the wearer's eyes. For example, the transmittance of the assembly 46 when driven by a pulse width modulated signal with a duty cycle of 80% is greater than when driven by an analogous signal with a duty cycle of 30%. Stated differently, the assembly may appear more lightened when driven by a pulse width modulated signal with a duty cycle of 70% compared to an analogous signal with a duty cycle of 40%.

Returning to the numerical example, the control method 350 will continue to process. However, application of the 67% duty cycle signal across the assembly 46's terminals may have had an impact on the amount of light detected by the light sensor 90 (i.e. the amount of light hitting the person's eye). For example, application of the 67% duty cycle signal across the assembly 46's terminals causes the light transmittance of the optical filter to increase. If external conditions stay constant, the amount of light detected by the light sensor will also increase, for example, from the previous value of 20 to a new value of 30. As the reading on the light sensor increases, the control system will modify the pulse width modulating signal in real time and decrease the duty cycle as the amount of light coming into the eyewear device goes up. In the example shown, the light detected by the light sensor increases to a value of 30, which is the upper setpoint. At this point the duty cycle will be 0% and the optical filter will be allowed to darken. The output signal duty cycle will remain at 0% until the lighting conditions change or the optical filter darkens sufficiently such that the light detected by the light sensor 90 decreases. Note that this can all be happening in real time so that the eyewear device can adjust dynamically and automatically to rapidly changing light conditions.

Returning to the numerical example, the control method 350 will continue the process. If the lighting conditions suddenly increase to 220, the light sensor 90 reading may increase to 33, which is above the upper setpoint. As a result, a 0% duty cycle is maintained allowing the optical filter to darken. As the light sensor 90 reading drops below the upper setpoint the duty cycle increases. However, due to the darkening vs. lightening kinetics of the optical filter, it is possible that the device will reach an equilibrium such that a 50% duty cycle voltage signal is applied to the optical filter and the optical filter reaches a steady (or intermediate) state half-way in-between the upper and lower setpoints. In this case, the light transmission through the optical filter is held at 10% as the pulse width modulated signal tries to lighten the optical filter to the upper setpoint but the ambient light causes the optical filter to darken.

The above-described process will continue such that the duty cycle of the pulse width modulated signal applied across the terminals of the assembly 47 is varied in order to maintain the amount of light detected by the light sensor 90 (i.e. the amount of light hitting the person's eye) at an intermediate state in-between the dark state and the light state.

Figure 20:
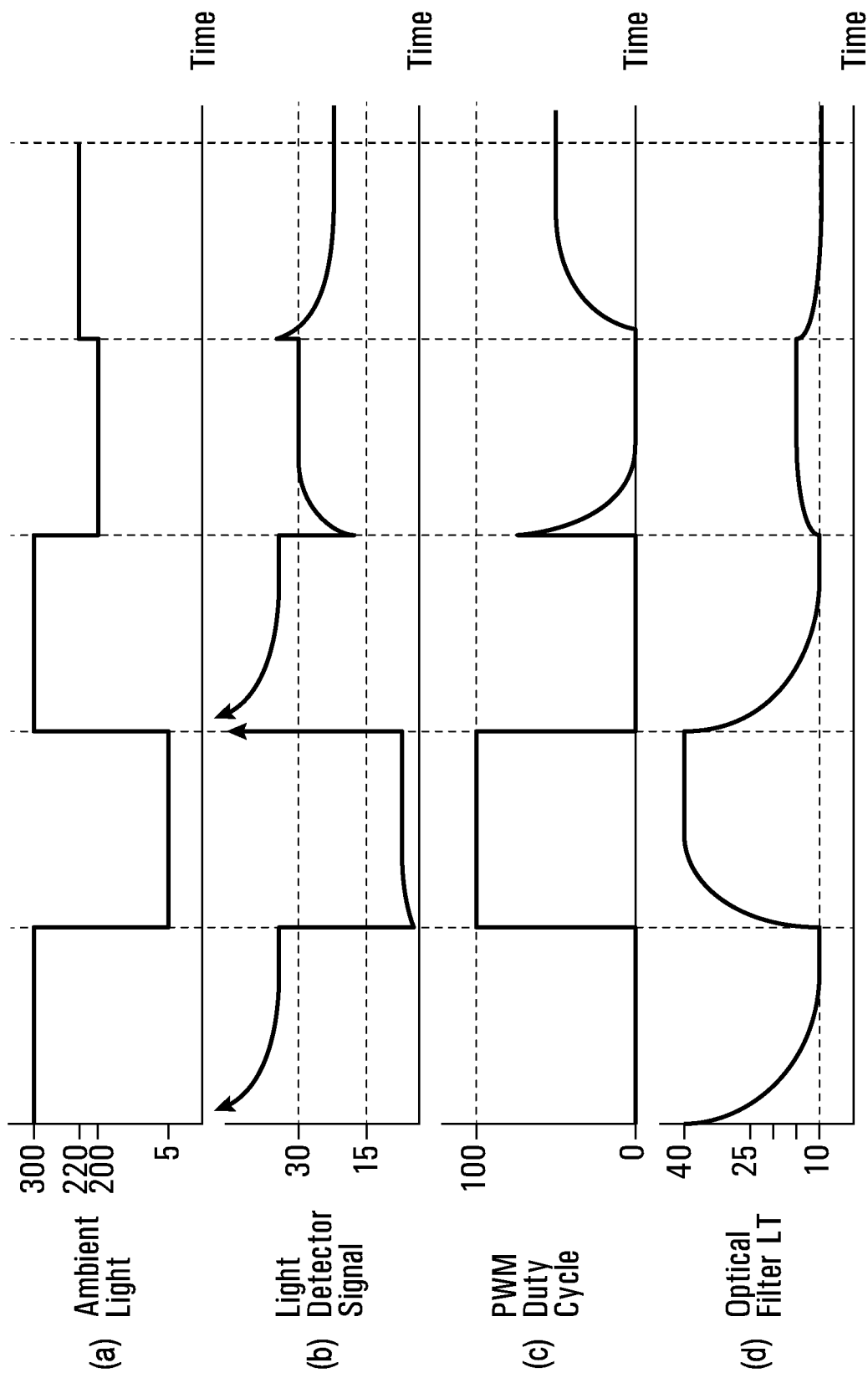
FIG. 20 is a plot illustrating (a) ambient light, (b) light detected by a light sensor of the control system of FIG. 18, (c) duty cycle of a pulse width modulated signal applied by the control system of FIG. 18, and (d) light transmittance of an optical filter assembly controlled by the control system of FIG. 18, wherein each of (a) to (d) are plotted against time.

With reference to the above-described numerical example, FIG. 20 graphically represents how (a) the ambient light, (b) the light detected by the light sensor 90, (c) the duty cycle of the pulse width modulated signal, and (d) the transmittance of the assembly 47 all vary with respect to time.

Figure 17:
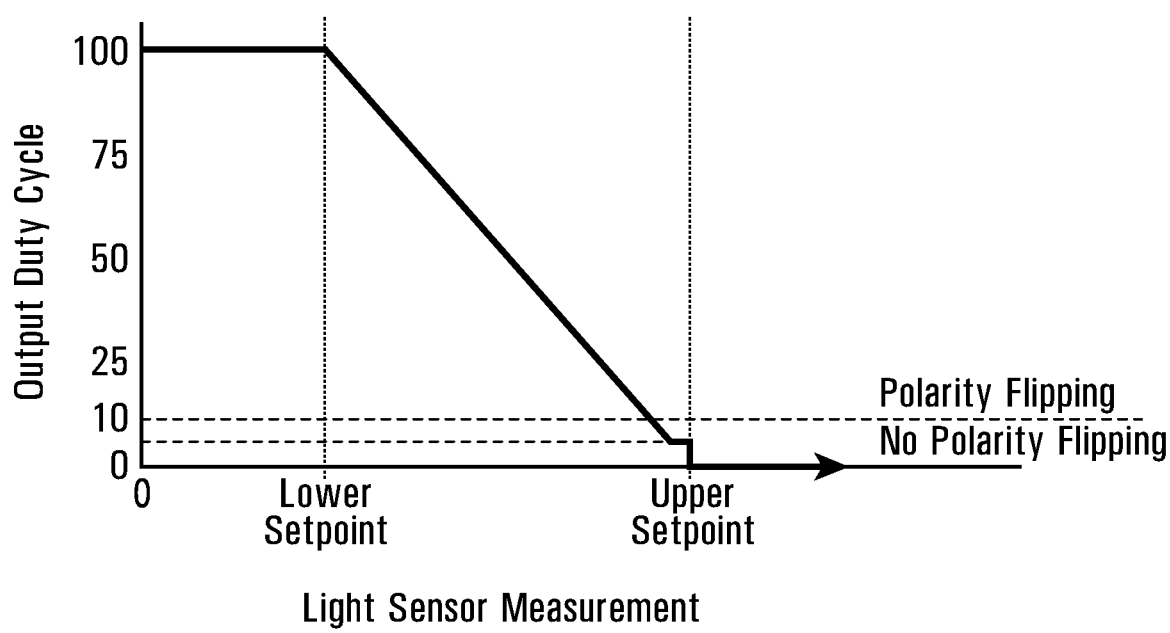
FIG. 17 is a plot illustrating output duty cycle as a function of light sensor measurement, wherein a pulse width modulated signal having a voltage pulse with the output duty cycle is applied across an optical filter assembly of a control system in accordance with an embodiment.

FIG. 17 graphically represents how the duty cycle varies in dependence on the amount of light detected by the light sensor 90 (i.e. the amount of light hitting the person's eye) in accordance with an embodiment. Specifically, the duty cycle is set to 100% when the measured light is below the lower setpoint and the duty cycle is set to 0% when the measured light is above the upper setpoint. In an embodiment implementing polarity flipping (as described above), the polarity flipping may cease when a duty cycle of 10% or lower is required. A minimum duty cycle limit of 5% may be required depending on the specific configuration of the assembly (i.e. formulation and conductive substrate of the optical filter), unless the light sensor 90 reading is above the upper setpoint after which the duty cycle may be decreased to 0%. It is to be understood that in some other embodiments, the values 100%, 0%, 10% and 5% may be different. It is to be understood that in the above embodiment 10% may be an example of a polarity-flipping limit and 5% may be an example of a non-polarity-flipping limit.

However, when the measured light is between the upper setpoint and the lower setpoint the duty cycle is defined by a linear relationship wherein the midpoint between the upper and lower setpoints results in a 50% duty cycle. With a 50% duty cycle, the voltage pulse controls the assembly 47 to lighten for half of the pulse width and allows the assembly 47 to darken for the remaining half. In some other embodiments, however, when the measured light is between the upper setpoint and the lower setpoint the duty cycle may be defined by a non-linear relationship, a step-wise relationship or a curved relationship. In such circumstances, the midpoint between the upper and lower setpoints may result in a duty cycle value other than 50%.

In an embodiment, the pulse width modulated signal applied across the terminals of the assembly 47 may have a period of 1 second and polarity flipping of the voltage pulses may be performed every 1 second. In this way, polarity of voltage pulses may flip between adjacent voltage pulses. In another embodiment, the period and polarity flipping interval may both be set to a different value, for example, 1.5 seconds, 2 seconds, 5 seconds, etc. In another embodiment, the period and the polarity flipping interval may be set to different values. For example, the period may be set to 1 second and the polarity flipping interval may be set to 2 seconds.

It is noted that the high dynamic range of light conditions means that it may not always be possible for the optical filter to keep the amount of light hitting the eye within a certain target range (e.g. between the upper and lower setpoints), since the optical filter has a finite range within which it can attenuate (e.g., between 10% and 40% light transmission). The control method 350 can make the lens fully dark (e.g. by applying a duty cycle of 0%), but in bright light conditions the light hitting the light sensor and the user's eye could still be above the upper setpoint. Similarly, the control method 350 can make the lens fully light (e.g. by applying a duty cycle of 100%) but in very low light conditions the light hitting the light sensor and the user's eye may still be below the lower setpoint.

In an embodiment, a pulse width of the voltage pulses of the pulse width modulated signal is no less than about 0.10 seconds if polarity flipping is performed and is no less than about 0.05 seconds if no polarity flipping is performed. However, it is to be understood that in different embodiments, the pulse width could be different. In some embodiments, the pulse width is selected based on the type of optical filter material used in the assembly 47. In some embodiments, the pulse width is adjusted or tuned with the idea being to allow an intermediate state to be achieved so that the eyewear control system is not only either in the fully dark mode or fully light mode.

In an embodiment, iterations of the control method 350 are performed at a rate at which the duty cycle of each successive voltage pulse is updated by the control method 350. In this way, the duty cycle of each voltage pulse of the pulse width modulated signal may be individually controlled. In another embodiment, the rate is such that the duty cycle of only every nth voltage pulse is updated, wherein n may be any number above 2. In this way, the duty cycle of every n voltage pulses of the pulse width modulated signal may be controlled together as one.

Pupil constriction and dilation in bright or low-light conditions can take a long time. There is a comfortable range in which the human eye can adapt. Keeping the eye in this comfortable range is preferred. According to the above-described embodiment, above this comfortable range the assembly 47 is maintained in a dark state, while below this range the assembly 47 is fully lightened. Within the range, the assembly 47 is maintained in an intermediate state to limit changes in incident light on the human eye. The above-described upper and lower setpoints may be selected to define the comfortable range of luminance. This comfortable range aims to represent an absolute irradiance change to which the human eye is able to easily and fairly quickly adapt. The control system 40 can therefore operate to try to maintain the luminance of light detected by the light sensor 90 (i.e. the amount of light hitting the person's eye) within this comfortable range and as close as possible to the 'ideal' luminance defined by the middle of the comfortable range. It is to be understood that in some embodiments, the upper setpoint and the lower setpoint may be adjustable by a user.

In an embodiment, a half-life lightening speed of the assembly 47 is 18 seconds. However, this 18 seconds can be perceived as being much faster (e.g., 3 seconds), likely because the rate of lightening of the assembly 47 is significantly faster than the human eye adaptation rate. Also, in an embodiment, the half-life darkening speed of the assembly 47 is greater than the half-life fading speed of the assembly 47. As such, the rate of darkening can appear to be more gradual to the user than the rate of lightening.

In an embodiment, a transition rate of the assembly 47 may be defined as a rate at which the assembly 47 darkens or fades. As will be understood from the above description, darkening and fading may be achieved by varying the duty cycle of voltage pulses of a pulse width modulated signal applied across the terminals of assembly 47. The duty cycle may therefore be set or varied in order to control the transition rate of the assembly 47. Additionally or alternatively, a magnitude of the voltage pulse may be set or varied in order to control the transition rate of the assembly 47. Specifically, the transition rate may be controlled with reference to the human eye adaptation rate. In particular, the fading transition rate may be controlled with reference to the human eye dark adaptation rate, and the darkening transition rate may be controlled with reference to the human eye light adaptation rate. For example, the duty cycle or voltage magnitude may be varied in order to maintain a transition rate of between 60% LT/min and 0% LT/min.

User Interface

Figure 18:
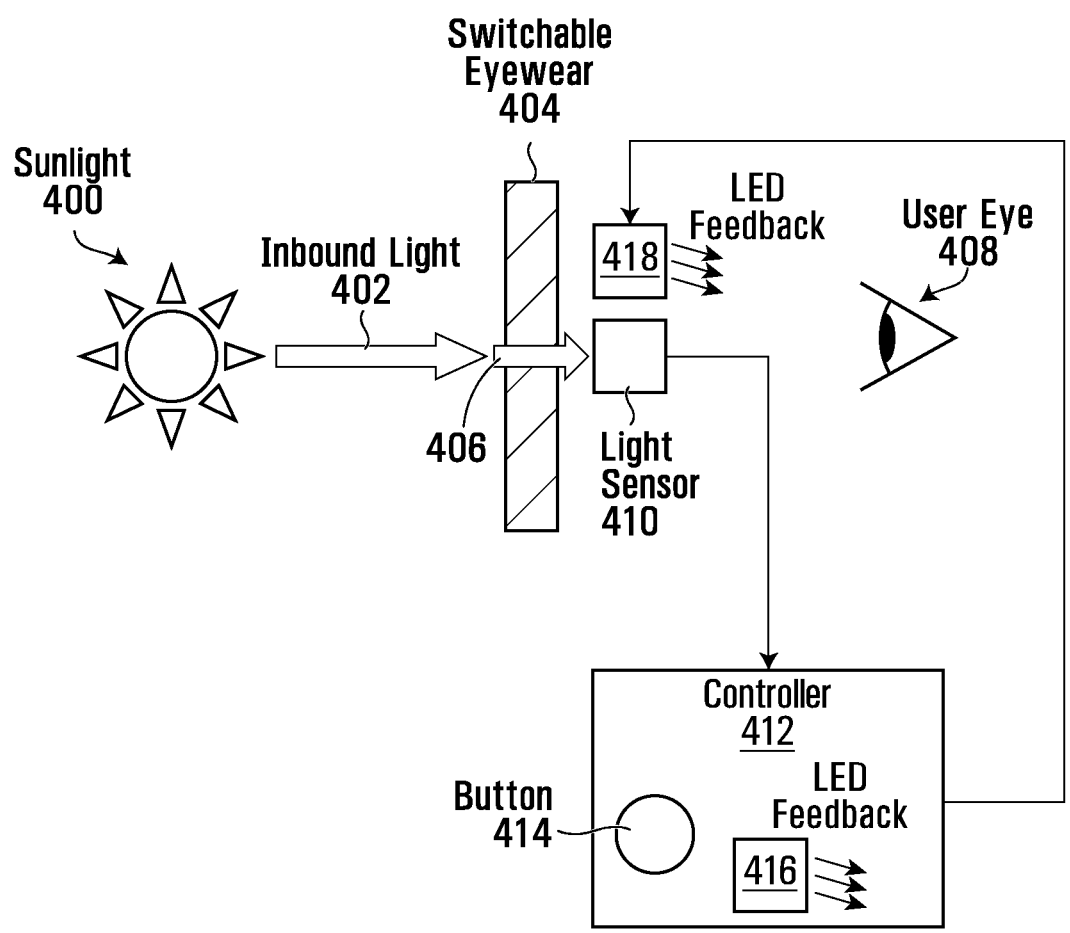
FIG. 18 is a block diagram of an eyewear control system in accordance with an embodiment.

FIG. 18 provides a schematic representation of the operation of an embodiment. A light source 400 provides inbound light 402 which is incident on eyewear device 404 having an eyewear control system in accordance with one of the above-described embodiments. The eyewear device 404 may be glasses or goggles. At least some of the inbound light 402 is transmitted through the optical filter assembly of the control system associated with the eyewear 404, as indicated by transmitted light 406. The difference between the luminance of the inbound light 402 and the luminance of the transmitted light 406 will depend, at least in part, on the transmittance of the optical filter assembly. The light transmitted through the optical filter assembly is incident on both the eye 408 of the person wearing the eyewear 404 and the light sensor 410 of the control system. That is, the light sensor 410 is positioned behind the optical filter assembly such that it receives substantially the same light as received by the eye 408. In this way, the luminance of the light detected by the light sensor 410 provides an accurate representation of the luminance of the light hitting the eye 408. The light sensor 410 is communicatively coupled to the controller 412 of the control system and provides the controller 412 with a detector output signal. The detector output signal may contain a luminance value of the light incident on the light sensor 410. The controller 412 may then cause the optical filter assembly to vary its transmittance in dependence on the detector output signal. It is to be understood that this embodiment is analogous to at least some of the above described embodiments, such as, the embodiments of FIGS. 1-4, 5, 6 and 7.

In the present embodiment, controller 412 is provided with an input device in the form of a button 414. The controller 412 is additionally provided with a first indicator light source 416, such as a light emitting diode. Also, the button 414 and the first indicator light source 416 may be contained within a housing of the control system, such as, for example, a housing similar to the housing 210 of FIG. 1A. Furthermore, a second indicator light source 416 (e.g. a light emitting diode) may be located with the light sensor 410, behind the optical filter assembly and in-between the eyewear lens and the face of the person wearing the eyewear.

The button 414, the first indicator light source and the second indicator light source 418 are each communicatively coupled to the controller 412. As such, the button 414 is capable of providing an input signal to the controller 412 when it is actuated, wherein the input signal indicates whether the button 414 was actuated via a short press or a long press.

In use, the button 414 may provide a means for cycling through various operating modes of the control system. Specifically, a sequence of button presses may permit an operator to cycle through different modes of operation including: ON, AUTO, OFF and SETPOINT modes. In the ON mode, a voltage may be applied to the terminals of the optical voltage assembly in order to keep the optical filter assembly in a light state. In the OFF mode, no voltage (or a short/open circuit) may be applied to the terminals of the optical voltage assembly in order to allow the optical filter assembly to transition to a dark state. In the AUTO mode, the light sensor 520 may be utilized to apply a pulse width modulated voltage signal to the optical filter assembly terminals when it is determined to be necessary or desirable. The operation may be as described above with reference to FIGS. 16 and 17 where the voltage signal duty cycle is directly related to the light sensor output signal, an upper setpoint, and a lower setpoint. As a result the system adapts the optical filter assembly to try to maintain the amount of light hitting the eye of the wearer in an intermediate state (or average value) in-between upper and lower setpoints. In the SETPOINT mode, the operator may adjust the upper and lower setpoints collectively to suit their personal preference or to account for ambient light conditions, such as indoor light conditions. By lowering the setpoints, the optical filter assembly will be maintained in a darker average state during AUTO mode, as compared with higher setpoints that will result in a lighter assembly on average.

Figure 19:
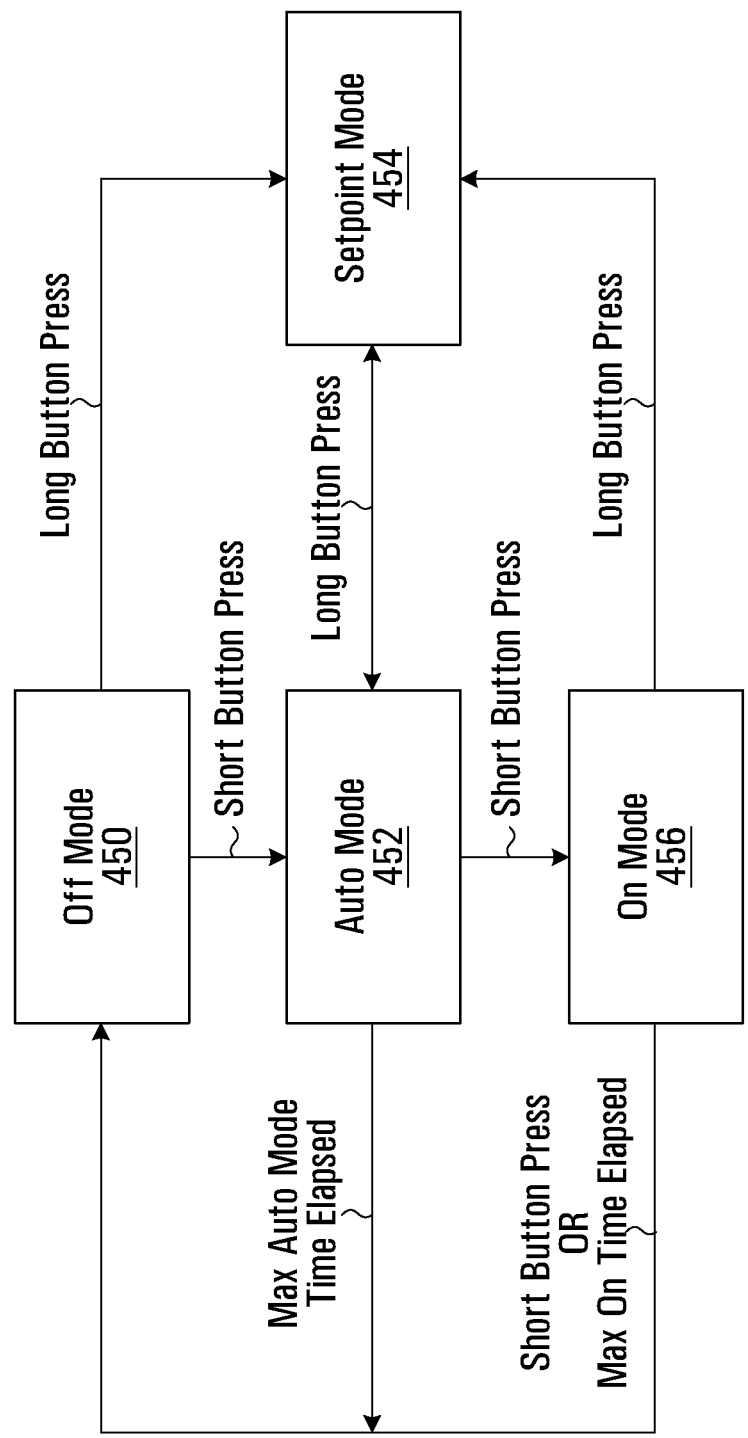
FIG. 19 is a state diagram of a sequence of operations performed by a user interface of an eyewear control system in accordance with an embodiment.

FIG. 19 is a state diagram depicting operations of an exemplary user interface which utilizes the button 414 to operate the control system into the various modes. At block 450, the control system is in the OFF mode. A short press of button 414 changes modes to the AUTO mode at block 452, and a long press of button 414 changes modes to the SETPOINT mode at block 454. From the AUTO mode at block 452, a short press of button 414 changes modes to the ON mode at block 456. Also, the AUTO mode automatically changes modes to the OFF mode after a preset time period, for example, 1 or 2 hours. From the ON mode at block 456, a short press of button 414 changes modes to the OFF mode at block 450, and a long press of button 414 changes modes to the SETPOINT mode at block 454. Also, the ON mode automatically changes modes to the OFF mode after a preset time period, for example, 1 or 2 hours. From the SETPOINT mode at block 454, a long press of button 414 changes modes to the AUTO mode at block 452. In this way, short and long presses of a single button can be used to cycle the control system through various different modes. In particular, short presses may be used to cycle through the OFF, AUTO and ON modes, while a long press may enter and exit the SETPOINT mode. Alternatively, in some embodiments the sequences may be changed such that short presses will cycle from OFF to ON to AUTO. In some other embodiments, the number of button presses rather than the duration of the press may cycle through the different modes. In the present embodiment, the user interface includes only a single button. However, in another embodiment, two or more buttons may be used. For example, each mode may have its own dedicated button. Also, in some other embodiments, a dial may be used with or instead of the button 414 and the dial may be rotated to cycle between different modes.

In an alternative embodiment, the OFF mode may be generated by applying across the terminals of the optical filter assembly a pulse width modulated signal having voltage pulses with a duty cycle of 0%. The ON mode may be generated by applying across the terminals of the optical filter assembly a pulse width modulated signal having voltage pulses with a duty cycle of 100%. The AUTO mode may vary the pulse width modulated voltage signal duty cycle between 0% and 100% as described above with reference to FIGS. 16 and 17. In this way, control system can vary the optical filter assembly transmittance to minimize variations in the light sensor output signal (i.e. the detector output signal) and subsequent changes to light irradiance reaching the user's eye. The SETPOINT mode does not vary duty cycle and instead changes the internal setpoints used during the AUTO mode.

The indicator light sources 416 and 418 may provide the person wearing the eyewear device 404 with a visual indicator that can be used to determine which mode of operation is currently active. For example, the OFF mode may be indicated by the indicator light sources 416 and 418 being turned off; the ON mode may be indicated by the indicator light sources 416 and 418 being turned on continuously; the AUTO mode may be indicated by the indicator light sources 416 and 418 pulsing between different light levels; and, the SETPOINT mode may be indicated by the indicator light sources 416 and 418 being turned on continuously but at a different brightness compared to the ON mode. In an alternative embodiment, different indicator lights could be used to differentiate between each mode. In yet another embodiment, multiple indicator lights could be used to indicate the selected setpoints in SETPOINT mode, or to indicate the status of AUTO mode (e.g. either lightening or darkening). The indicator light source 416 is located with the housing of the control system and the indicator light source 418 is located with the optical filter assembly of the control system. In this way, the person wearing the eyewear device 404 may easily see the indicator light source 418 because it is located close to their eye.

In another embodiment, one or more other SETPOINT modes may be provided. Each SETPOINT mode may be associated with different values of upper and lower setpoints. For example, a SETPOINT1 mode may define an upper setpoint of 60 and a lower setpoint of 30, a SETPOINT2 mode may define an upper setpoint of 30 and a lower setpoint of 15, a SETPOINT3 mode may define an upper setpoint of 22 and a lower setpoint of 11, a SETPOINT4 mode may define an upper setpoint of 16 and a lower setpoint of 8, a SETPOINT5 mode may define an upper setpoint of 10 and a lower setpoint of 5, a SETPOINT6 mode may define an upper setpoint of 1 and a lower setpoint of 0. The setpoints corresponding to one or more SETPOINT modes may be user configurable. Navigation to the one or more other SETPOINT modes may be integrated into the user interface, for example, by short button presses while in the SETPOINT mode, or through the use of one or more additional buttons. In an embodiment, a table may be stored in memory and each row of the table may contain a different possible setpoint value pair. A user may make short presses while in the SETPOINT mode to cycle through the different rows in the table. When the user stops making short presses, the value pair corresponding to the table row at which the short presses stopped may be used as the upper and lower setpoints in the AUTO mode.

Changing the setpoints changes the comfortable range of luminance. In this way, some embodiments may be configured to operate with one or more personalized comfort ranges. Such functionality enables these embodiments to better suit the needs of individual people by adapting to differences in personal preferences on the darkness or lightness of eyewear lenses. The setpoints may also be used to account for differences in lighting environments, such that the same lens and control system (albeit using different setpoints) can be used indoors, outdoors with no snow, and outdoors with snow.

In another embodiment, in contrast to the embodiment of FIG. 1A, the housing containing the button 414 and the first indicator light source 416 may not be coupled to the eyewear and, instead, may be provided in a wrist mounted or hand-held housing. Additionally, the button 414 may be replaced by or supplemented with a wireless receiver. In this way, the controller 412 may be configured to receive instructions via the receiver from a remote device, such as, for example, a mobile computing device. In this case, it is to be understood that button 414 presses may be replaced by instructions received by the receiver from the remote device. For example, the remote device might send combinations of first and second commands, wherein the first command corresponds to a short press of button 414 and the second command corresponds to a long press of button 414.

Eyewear Optical Filtering System

The following description refers to an optical filtering system; however, it is to be understood that the optical filtering system is for use with an eyewear device. As such, the optical filtering system is considered an eyewear optical filtering system. FIGS. 1A to 1F and 2 indicate possible ways in which the optical filtering system may be applied to an eyewear device. In an embodiment, the eyewear optical filter system provides or includes an eyewear control system.

Referring to FIGS. 10 to 14, there are shown embodiments of an optical filtering system 120 comprising various types of switching circuitry 44 in contrast to H-Bridges as described above. As shown in FIGS. 10 to 14, the optical filtering system 120 includes switching circuitry 44 having a pair of input voltage terminals 43 and a pair of load terminals 45, and the optical filter assembly 46 is coupled across the load terminals 45. With reference to the eyewear device to which the optical filtering system 120 relates, it is to be understood that the optical filter assembly 46 covers at least a portion of a lens of the eyewear. A power supply 42 is coupled to the input voltage terminals 43 to provide an input voltage.

Figure 10:
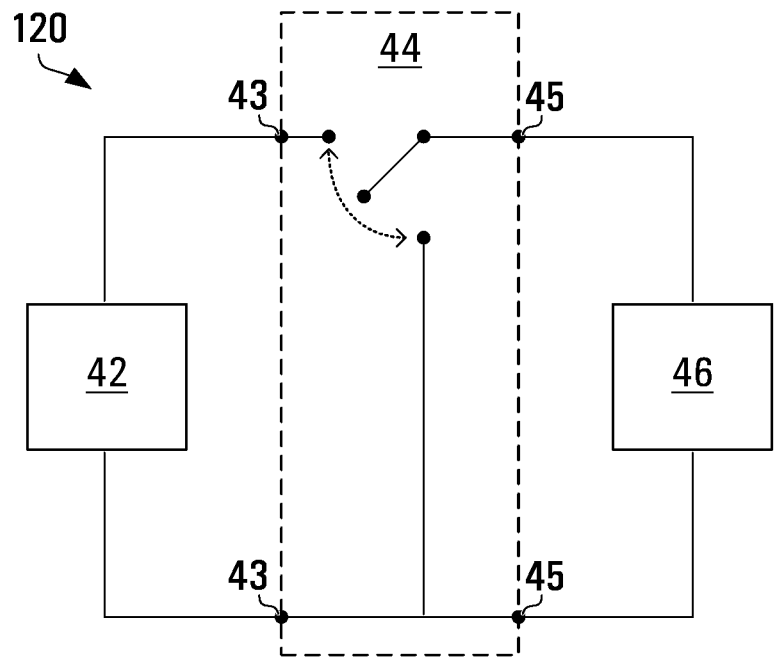
FIG. 10 is a block diagram of an eyewear optical filtering system comprising switching circuitry in the form of a single pole, double throw (SPDT) switch, according to an embodiment.
Figure 12:
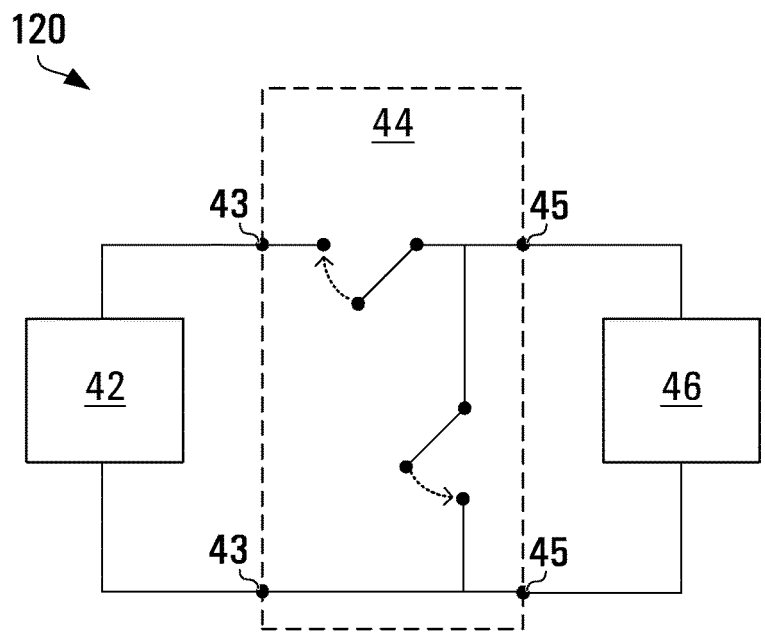
FIG. 12 is a block diagram of the eyewear optical filtering system comprising switching circuitry in the form of single pole, single throw (SPST) switches, according to an embodiment.
Figure 13:
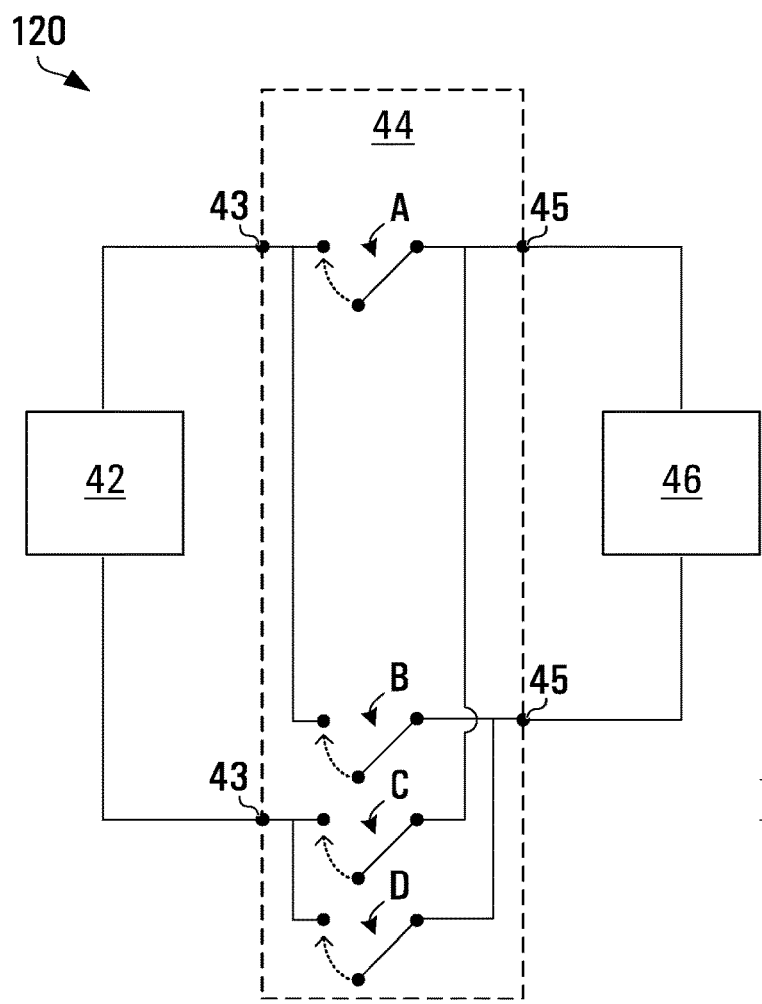
FIG. 13 is a block diagram of the eyewear optical filtering system comprising switching circuitry in the form of an H-bridge, according to an embodiment.

Referring to the embodiment of FIG. 10, the switching circuitry 44 comprises a single pole, double throw (SPDT) switch coupled between the input voltage terminals 43 and the load terminals 45 in order to switch between the light and dark states. The SPDT switch may be manually controlled. However, switching circuitry 44 may comprise other types of switches in other embodiments, and for example, may comprise a double pole, double throw (DPDT) switch (FIG. 11), multiple single pole, single throw switches (FIG. 12), or an H-bridge (FIG. 13). These various types of switches may be manually controlled. The system 120 of FIG. 10 is able to short the assembly 46 terminals together and to a common terminal of the power supply 42; the system 120 of FIG. 11 is able to short the assembly 46 terminals to each other independently of the power supply 42; the system 120 of FIG. 12 is able to short the assembly 46 terminals to a common terminal of the power supply 42 while independently controlling whether to apply any of the input voltage across the assembly 46; and the system 120 of FIG. 13 allows for forward voltage, reverse voltage, open circuit, or short circuit configuration of the assembly 46 terminals.

Figure 14:
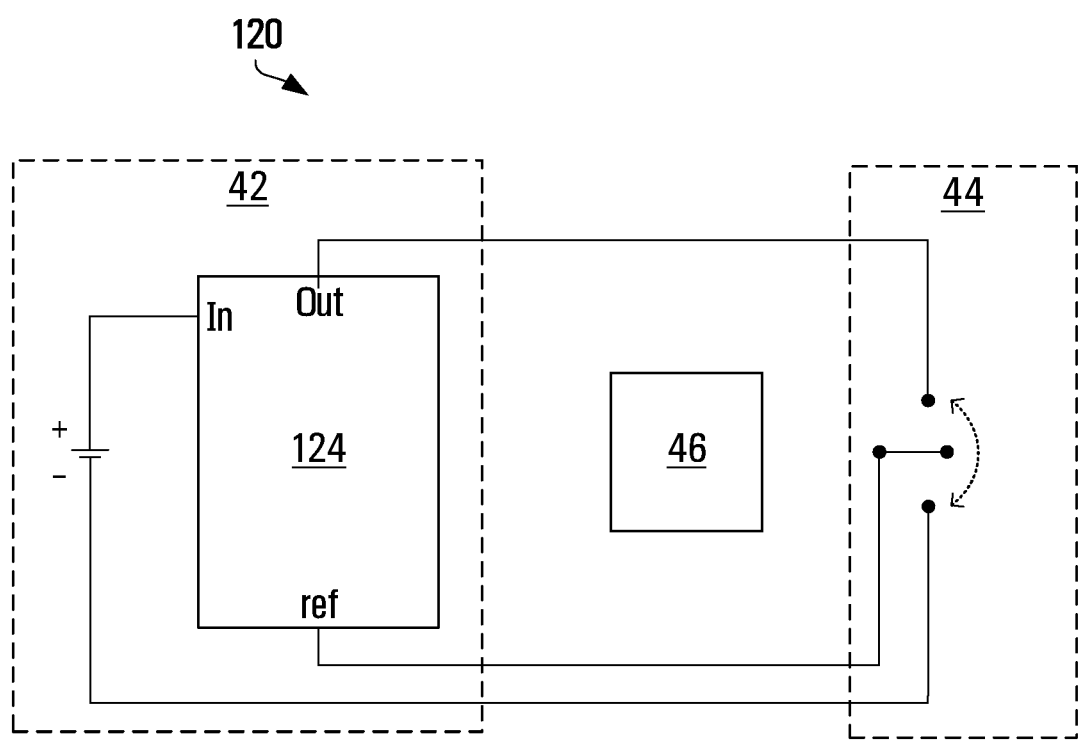
FIG. 14 is a block diagram of the eyewear optical filtering comprising switching circuitry coupled to a voltage regulator, according to an embodiment.

Referring to FIG. 14 is an embodiment where the power supply 42 comprises a voltage regulator 124 coupled to an AC or DC power source, and the input voltage terminals 43 and the load terminals of the switching circuitry 44 share a common electrode terminal coupled to a reference output of the voltage regulator 124.

The optical filtering system 120 may also be configured to provide a pulse train as the portion of the input voltage applied across the pair of load terminals 45 through operation of the switching circuitry 44. In alternative embodiments, the optical filtering system 120 may be used in adaptive and closed-loop configurations, analogous to the systems 40 described above. Similarly, in further alternative embodiments, the period, duty cycle, and amplitude of the pulse train or input voltage applied to the load terminal 45 can be adjusted in accordance with readings from a detector 47, switch 61, or any other sensory input. With reference to the eyewear device to which the optical filtering system 120 relates, it is to be understood that the detector 47 may be or may include a light sensor positioned to receive light transmitted through the assembly 46 and towards the eye of the person wearing the eyewear. In an embodiment, the light sensor is positioned behind the assembly 46, that is, in-between the assembly 46 and the eye of the person wearing the eyewear device.

In the foregoing embodiments, the controller 48 is communicatively coupled to the assembly 46 via the switching circuitry 44. However, in alternative embodiments (not depicted), the controller 48 may be directly coupled to the assembly 46 without the switching circuitry 44, where the controller's 48 output pins may act as the load terminals 45 for the assembly 46. In these embodiments, the controller 48 can adjust the voltage levels on its output pins to drive the assembly 46 into the light state, to open circuit or short the terminals of the assembly 46 together to facilitate transition to the dark state, to maintain the assembly 46 in intermediate state, to apply a voltage signal of alternating polarity to drive the assembly to a light state, and to otherwise control the assembly 46 as desired. As used in this disclosure, the terms "coupled" and "in communication" refer to a relationship between two elements such that they are communicatively coupled. For the sake of convenience, the exemplary embodiments above are described as various interconnected functional blocks or distinct software modules. This is not necessary, however, and there may be cases where these functional blocks or modules are equivalently aggregated into a single logic device, program or operation with unclear boundaries. In any event, the functional blocks or software modules can be implemented by themselves, or in combination with other operations in either hardware or software.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible. The description should be understood as illustrative of the invention, but should not be considered as limiting on the claims appended hereto. The scope of the claims should be interpreted having regard to the spirit of the invention and given the broadest possible interpretation consistent with the description as a whole.

The invention claimed is:

1. An eyewear device comprising:
   a lens;
   a variable transmittance optical filter assembly comprising a pair of terminals and an optical filter electrically coupled to the pair of terminals, wherein the variable transmittance optical filter assembly covers at least a portion of the lens, and wherein the optical filter is a hybrid photochromic-electrochromic optical filter; and
   an eyewear control system for the variable transmittance optical filter assembly, the eyewear control system comprising:
   (a) a controller communicatively coupled to a pair of load terminals for electrically coupling to the pair of terminals of the optical filter assembly;
   (b) a light sensor communicatively coupled to the controller to provide a detector output signal, the light sensor being positioned to receive sunlight transmitted through the optical filter assembly and towards an eye of a person when wearing the eyewear device, the detector output signal being set in dependence on an amount of sunlight received by the light sensor; and
   (c) a memory communicatively coupled to the controller and having encoded thereon computer program code executable by the controller to transition the optical filter assembly between operating states,
   wherein the controller varies a voltage across the load terminals in dependence on the detector output signal to vary an amount of sunlight transmitted through the optical filter assembly.

2. The eyewear device of claim 1 wherein the computer program code encoded on the memory is executable by the controller to apply a pulse width modulated voltage signal across the load terminals, wherein the pulse width modulated signal comprises a plurality of voltage pulses.

3. The eyewear device of claim 2 wherein the computer program code encoded on the memory is executable by the controller to vary a duty cycle of at least one of the plurality of voltage pulses in dependence on the detector output signal.

4. The eyewear device of claim 3 wherein the computer program code encoded on the memory is executable by the controller to vary the duty cycle when the detector output signal is at or above a first threshold and at or below a second threshold.

5. The eyewear device of claim 4 wherein the computer program code encoded on the memory is executable by the controller to calculate the duty cycle by applying a gain to a difference between the second threshold and the detector output signal.

6. The eyewear device of claim 5 wherein, if the calculated duty cycle is below a lower duty cycle limit, the duty cycle is set to the lower duty cycle limit and, if the calculated duty cycle is above an upper duty cycle limit, the duty cycle is set to the upper duty cycle limit.

7. The eyewear device of claim 4 wherein the computer program code encoded on the memory is executable by the controller to apply the pulse width modulated voltage signal across the load terminals by:
   comparing the detector output signal to the first threshold;
   setting the duty cycle of at least one of the plurality of voltage pulses to a first preset duty cycle when the detector output signal is below the first threshold;
   comparing the detector output signal to the second threshold; and
   setting the duty cycle of at least one of the plurality of voltage pulses to a second preset duty cycle when the detector output signal exceeds the second threshold.

8. The eyewear device of claim 4 wherein the detector output signal comprises a luminance value, the first threshold is a lower luminance threshold, and the second threshold is an upper luminance threshold.

9. The eyewear device of claim 2 wherein each of the plurality of voltage pulses has a pulse width between 0.05 seconds and 0.10 seconds.

10. The eyewear device of claim 2 wherein at least one of the voltage pulses is set to a voltage of one polarity and at least another of the voltage pulses is set to a voltage of an opposite polarity, in dependence on the detector output signal.

11. The eyewear device of claim 1 further comprising an input device communicatively coupled to the controller to provide an input signal, and wherein the computer program code encoded on the memory is executable by the controller to vary the voltage across the load terminals in dependence on the input signal.

12. The eyewear device of claim 11, wherein the computer program code encoded on the memory is executable by the controller to vary a duty cycle of at least one of the plurality of voltage pulses in dependence on the input signal.

13. The eyewear device of claim 12 wherein the computer program code encoded on the memory is executable by the controller to set a duty cycle of at least one of the plurality of voltage pulses to a constant value in dependence on the input signal.

14. The eyewear device of claim 12, when directly or indirectly dependent on claim 4, wherein the computer program code encoded on the memory is executable by the controller to set at least one of the first and second thresholds in dependence on the input signal.

15. The eyewear device of claim 11 wherein the input device comprises at least one of a switch, a clock, a timer, and a receiver.

16. The eyewear device of claim 11 wherein the input device comprises a single button, the single button being operable to provide different input signals depending on a length of time the single button is depressed.

17. The eyewear device of claim 1 further comprising a housing coupleable to a portion of the eyewear device, the housing being configured to enclose at least the controller and the memory.

18. A method for controlling an eyewear device comprising a lens and a variable transmittance optical filter assembly comprising a pair of terminals and an optical filter electrically coupled to the pair of terminals, wherein the variable transmittance optical filter assembly covers at least a portion of the lens, and wherein the optical filter is a hybrid photochromic-electrochromic optical filter, the method comprising:
   (a) detecting an amount of sunlight transmitted through the optical filter assembly and towards an eye of a person wearing the eyewear device; and
   (b) varying an electrical voltage applied across the pair of terminals in dependence on the detected amount of sunlight to vary an amount of sunlight transmitted through the optical filter assembly.

* * * * *